(12) United States Patent
Jobmann

(10) Patent No.: US 8,275,995 B2
(45) Date of Patent: Sep. 25, 2012

(54) IDENTITY AUTHENTICATION AND SECURED ACCESS SYSTEMS, COMPONENTS, AND METHODS

(75) Inventor: Brian C. Jobmann, Alpharetta, GA (US)

(73) Assignee: Department of Secure Identification, LLC, Alpharetta, GA (US)

( * ) Notice: Subject to any disclaimer, the term of this patent is extended or adjusted under 35 U.S.C. 154(b) by 0 days.

(21) Appl. No.: 13/303,357

(22) Filed: Nov. 23, 2011

(65) Prior Publication Data

US 2012/0066507 A1    Mar. 15, 2012

Related U.S. Application Data

(62) Division of application No. 12/172,654, filed on Jul. 14, 2008, now Pat. No. 8,078,885.

(60) Provisional application No. 61/049,613, filed on May 1, 2008, provisional application No. 60/987,312, filed on Nov. 12, 2007, provisional application No. 60/949,282, filed on Jul. 12, 2007.

(51) Int. Cl.
G06F 21/00 (2006.01)
H04L 29/06 (2006.01)

(52) U.S. Cl. ............... 713/186; 713/185; 713/159

(58) Field of Classification Search ............ 713/182, 713/185, 186, 159, 168; 726/2, 4, 5, 17–20; 380/277, 44, 45
See application file for complete search history.

(56) References Cited

U.S. PATENT DOCUMENTS

| | | |
|---|---|---|
| 5,623,552 A | 4/1997 | Lane |
| 6,038,315 A | 3/2000 | Strait et al. |
| 6,219,439 B1 | 4/2001 | Burger |
| 6,307,956 B1 | 10/2001 | Black |
| 6,325,285 B1 | 12/2001 | Bartelli |
| 6,484,259 B1 | 11/2002 | Barlow |
| 6,539,101 B1 | 3/2003 | Black |
| 6,695,207 B1 | 2/2004 | Norris, Jr. |
| 6,848,617 B1 | 2/2005 | Fries et al. |
| 6,957,337 B1 | 10/2005 | Chainer et al. |
| 6,959,874 B2 | 11/2005 | Bardwell |
| 6,983,882 B2 | 1/2006 | Cassone |
| 7,028,893 B2 | 4/2006 | Goodman et al. |
| 7,039,812 B2 | 5/2006 | Kawan et al. |

(Continued)

OTHER PUBLICATIONS

GENKEYCORP.COM; Cost Effective Biocryptic ID Management; Article from the Internet; Printed Apr. 2008; 6 pgs.

(Continued)

*Primary Examiner* — Zachary A Davis
(74) *Attorney, Agent, or Firm* — Gardner Groff Greenwald & Villanueva, PC

(57) ABSTRACT

Security tokens contain data that is each uniquely encrypted based on a unique biometric identifier of an authorized user of that token. Decoders receive the token and the user's biometric identifier, convert the biometric identifier to a biometric key, and apply the biometric key to decrypt the token. In this way, the decoders authenticate the users without performing a biometric identifier comparison. In some embodiments pieces or sets of the data are stored in designated data compartments, which are individually encrypted based on authority keys, and all of the encrypted data compartments are collectively encrypted based on the biometric key to create the token. The decoders store only the authority keys corresponding to the data compartments which they have authorization to open. In addition, in some embodiments the token and the biometric identifier are encrypted and sent to a remote authentication server for decryption of the token.

23 Claims, 10 Drawing Sheets

U.S. PATENT DOCUMENTS

| | | | |
|---|---|---|---|
| 7,047,416 B2 | 5/2006 | Wheeler et al. | |
| 7,076,062 B1 | 7/2006 | Spies | |
| 7,079,670 B2 | 7/2006 | Pan et al. | |
| 7,082,213 B2 | 7/2006 | Black | |
| 7,089,214 B2 | 8/2006 | Wang | |
| 7,142,091 B2 | 11/2006 | Lane | |
| 7,178,025 B2 | 2/2007 | Scheidt et al. | |
| 7,185,199 B2 * | 2/2007 | Balfanz et al. | 713/168 |
| 7,188,362 B2 | 3/2007 | Brandys | |
| 7,200,756 B2 | 4/2007 | Griffin et al. | |
| 7,237,114 B1 | 6/2007 | Rosenberg | |
| 7,392,387 B2 * | 6/2008 | Balfanz et al. | 713/168 |
| 7,610,616 B2 | 10/2009 | Masuouka et al. | |
| 7,844,579 B2 | 11/2010 | Peterson et al. | |
| 7,930,543 B2 * | 4/2011 | Corndorf | 713/172 |
| 2002/0062451 A1 * | 5/2002 | Scheidt et al. | 713/201 |
| 2002/0095588 A1 | 7/2002 | Shigmatsu et al. | |
| 2002/0097142 A1 | 7/2002 | Janiak et al. | |
| 2002/0099665 A1 | 7/2002 | Burger et al. | |
| 2002/0124176 A1 * | 9/2002 | Epstein | 713/186 |
| 2002/0178370 A1 | 11/2002 | Gurevich et al. | |
| 2003/0046555 A1 | 3/2003 | Bradley et al. | |
| 2003/0070101 A1 * | 4/2003 | Buscemi | 713/202 |
| 2003/0154382 A1 | 8/2003 | Vicard | |
| 2003/0204732 A1 | 10/2003 | Audebert et al. | |
| 2003/0208684 A1 | 11/2003 | Camacho et al. | |
| 2004/0034783 A1 | 2/2004 | Fedronic et al. | |
| 2004/0050930 A1 | 3/2004 | Rowe | |
| 2004/0059924 A1 | 3/2004 | Soto et al. | |
| 2004/0064728 A1 | 4/2004 | Scheurich | |
| 2004/0123114 A1 | 6/2004 | McGowan | |
| 2004/0250084 A1 | 12/2004 | Hamid | |
| 2004/0250085 A1 | 12/2004 | Tattan et al. | |
| 2005/0029349 A1 | 2/2005 | McGregor et al. | |
| 2005/0039027 A1 | 2/2005 | Shapiro | |
| 2005/0077348 A1 | 4/2005 | Hendrick | |
| 2005/0081044 A1 | 4/2005 | Giles et al. | |
| 2005/0160052 A1 | 7/2005 | Schneider et al. | |
| 2005/0240778 A1 | 10/2005 | Saito | |
| 2005/0240779 A1 | 10/2005 | Aull et al. | |
| 2006/0129838 A1 | 6/2006 | Chen et al. | |
| 2006/0149971 A1 | 7/2006 | Kozlay | |
| 2006/0174134 A1 | 8/2006 | Taylor | |
| 2006/0213982 A1 | 9/2006 | Cannon et al. | |
| 2006/0215886 A1 | 9/2006 | Black | |
| 2006/0219776 A1 | 10/2006 | Finn | |
| 2006/0239511 A1 | 10/2006 | White et al. | |
| 2006/0288233 A1 | 12/2006 | Kozlay | |
| 2007/0005511 A1 | 1/2007 | Martinez | |
| 2007/0024551 A1 | 2/2007 | Gelbman | |
| 2007/0040017 A1 | 2/2007 | Kozlay | |
| 2007/0043594 A1 | 2/2007 | Lavergne | |
| 2007/0067642 A1 | 3/2007 | Singhal | |
| 2007/0079136 A1 | 4/2007 | Vishik et al. | |
| 2007/0113097 A1 | 5/2007 | Wang | |
| 2007/0119924 A1 | 5/2007 | Register, Jr. et al. | |
| 2007/0124597 A1 | 5/2007 | Bedingfield, Sr. | |
| 2007/0131759 A1 | 6/2007 | Cox et al. | |
| 2007/0168290 A1 | 7/2007 | Robinson | |
| 2007/0180261 A1 | 8/2007 | Akkermans et al. | |

OTHER PUBLICATIONS

International Search Report and Written Opinion; Date of Mailing: Oct. 7, 2008; For PCT/US08/69958; 10 pgs.

SUNGARD.COM; Electronic & Digital Signature Solution Overview—Signix; Article from the Internet; Printed Jun. 25, 2008; 2 pgs.

* cited by examiner

IDENTITY AUTHENTICATION AND SECURED ACCESS SYSTEMS, COMPONENTS, AND METHODS

CROSS-REFERENCE TO RELATED APPLICATION

This application is a divisional of U.S. patent application Ser. No. 12/172,654 filed Jul. 14, 2008, which claims the priority benefit of U.S. Provisional Patent Application Ser. No. 61/049,613 filed May 1, 2008, U.S. Provisional Patent Application Ser. No. 60/987,312 filed Nov. 12, 2007, and U.S. Provisional Patent Application Ser. No. 60/949,282 filed Jul. 12, 2007, the entire scope and content of all of which are hereby incorporated herein by reference.

TECHNICAL FIELD

The present invention relates generally to identity authentication systems and, in particular, to systems and methods for authenticating a user's identity and permitting an authenticated user to access to secured information and/or areas.

BACKGROUND OF THE INVENTION

Currently there is an enormous problem with identity theft. Most people think of identity theft in the sense of financial identity theft, for example, stealing a credit card account number and/or social security number to make unauthorized purchases. While this is a significant portion of all identity theft incidents, there are many other types of identity theft including medical, insurance, perimeter, and network (or computer/electronic) identity theft. Medical and insurance identity thefts involve accessing one's medical and insurance information, respectively, which can be misused in unauthorized hands. Perimeter identity theft involves the theft of a personal identity in order to gain access to a restricted area—a particularly important issue for airports, nuclear power plants, municipal water supply facilities, etc. And network identity theft relates to the theft of a user identity in order to gain unauthorized access to a computer system such as a military or corporate computer network.

The technology currently available for identity security suffers from the significant problem of a lack of identity authentication. The U.S. government uses the term "strong authentication" as a rating of the robustness of the security of an identity authentication system. An identity authentication system is rated as a strong authentication system if it uses at least two of the following authenticators: (1) something the user has (a security token, driver's license, credit card, debit/ATM card, smart card, clearance badge, keychain fob, etc.); (2) something the user knows (a password, PIN, zip code, etc.); and (3) something the user is (a signature, fingerprint, DNA, etc.). While it may seem that having two or even all three of these authenticators would make the authentication strong, the reality is that all or most all of these authenticators can be compromised. And oftentimes in practice one or more of them are not even used at all. For example, credit card services originally met the requirements of strong authentication because they used a credit card the user had (authenticator 1) and a signature of the user (authenticator 3). But in current practice the user signatures are rarely checked during credit card transactions, and credit card companies actually promote that this increases the speed and convenience of using their cards.

Identity authentication systems using biometric identifiers have been developed in an effort to provide increased identity security. Even the newest and best biometric identity authentication systems, however, are prone to compromise. Their security depends on restricting access to biometric identifier files stored on centrally located databases or individual tokens. Storing the biometric identifier files on central databases poses obvious problems, such as the databases being high-value targets for thieves (i.e., hackers). And when the biometric identifier files are stored on the tokens, even though the biometric identifier files are dispersed among the numerous individual tokens, the tokens are still prone to hacking. This is because conventional token-based systems include token readers that access a biometric identifier file on a token, receive a user-inputted biometric identifier, and perform a comparison to authenticate the user's identity. Because the reader has to have the ability to access the biometric identifier files on the tokens, the thieves attack there. Hack one reader and gain access to one token and therefore all tokens. Simply switch out the biometric identifier file stored on the token with one for the thief, and the user's identity has been stolen.

Accordingly, it can be seen that needs exist for improvements in securing access to confidential information and secured places and, in particular, for improvements in authenticating the identity of persons who are attempting to gain access to the confidential information or the restricted-access location. It is to the provision of solutions meeting these and other needs that the present invention is primarily directed.

SUMMARY OF THE INVENTION

Generally described, the present invention provides systems, components, and methods for authenticating the identity of users and, in some cases, permitting authenticated users to access secured data or areas. The identity authentication systems include security tokens and decoders. The tokens contain data that is encrypted based on a unique biometric identifier of an authorized user of that token. Set-up workstations and methods are provided for this encryption. A user presents a token and a biometric identifier to one of the decoders for local or remote decoding. Conversion software is used to convert the biometric identifier to a unique biometric key, and decryption software is used to apply the biometric key to the token to open the token. In this way, only the authorized user can access the data on the token. And the user and the token are authenticated without the need to access a centrally or locally stored biometric identifier file and/or perform a comparison to the inputted biometric identifier.

In a first example system and method, the decoder stores the conversion software and the decryption software, and the decryption/authentication is done locally on the decoder. In a second example system and method for remote authentication, the system further includes an authentication server. In this embodiment, the decoder retrieves a one-time key (OTK) from the server, collects the token and the biometric identifier, encrypts them together into a package, and sends the encrypted package to the server for performing the authentication process. And in a third example embodiment, the token is encrypted based on a first OTK, the token and biometric identifier are encrypted into a package based on a second OTK and sent to the authentication server for the authentication process. Upon successful authentication, the authentication server sends the first OTK to the device to open the token.

In some "authentication-only" embodiments, the purpose of opening the tokens is merely to authenticate the user and the token. So the data stored in the token may not be of any particular importance. In other "authentication-only" embodiments, the data includes user information, security clearance level information (or authorization data), etc. that is used after the user is authenticated. And in some "secured data" embodiments, the purpose of opening the token is to authenticate the user and/or the token and additionally to access to the data secured in the token.

In addition, in some embodiments pieces or sets of data are stored in designated data compartments, which are encrypted and decrypted based on authority keys. The authority keys are stored on a decoder or an authentication server, which only have access to the authority keys corresponding to the data compartments which they have authorization to open. Typically, each data compartment is encrypted/decrypted based on its own dedicated authority key, though sets of data compartments can be collectively encrypted/decrypted based on a single authority key. In this way, each piece of data is encrypted twice, once when its data compartment is encrypted based an authority key and once when all of the data compartments (the entire token) are collectively encrypted based a biometric key to create the token.

Furthermore, in some embodiments the tokens are encrypted based on two or more biometric keys, which may be based on the same or a different biometric identifier. In some of these embodiments, the token is encrypted/decrypted in a multi-step process with each step using a different biometric key. And in some other embodiments, the token is encrypted/decrypted based on one biometric key and the data compartments are encrypted/decrypted (in addition to or instead of the authority key encryption/decryption) based on the same or a different biometric key. And in some other embodiments the token encryption/decryption algorithm(s) are selected based on a biometric identifier.

The specific techniques and structures employed by the invention to improve over the drawbacks of the prior systems and methods and accomplish the advantages described herein will become apparent from the following detailed description of the example embodiments of the invention and the appended drawings and claims.

DETAILED DESCRIPTION OF EXAMPLE EMBODIMENTS OF THE INVENTION

The present invention provides identity authentication systems and methods using security tokens and token decoders. Each one of the tokens is uniquely encrypted based on a biometric identifier of an authorized user of that token. As used herein, the term "user" means the person being authenticated. The decoders receive as inputs the token and the user's biometric identifier. Then the decoders convert the user's biometric identifier to a biometric key and apply the biometric key to decrypt and thereby open the uniquely encrypted token. In this way, the systems meet the basic criteria for strong authentication by using something the user has—a token—and something the user is—a biometric identifier. In addition, the systems represent a radical departure from conventional biometric identity authentication systems, which authenticate identity by performing a comparison of a biometric identifier presented by the user with a biometric identifier stored in the user's token or a centrally located database. The systems according to the present invention, however, perform no such comparison, so they do not even need to store the user's biometric identifier. Instead, the biometric identifier presented by the user is converted to a biometric key that decrypts/opens the token. In this way, the system is truly secure because it does not include the potential points of attack that existing identity authentication systems have.

Figure 1:
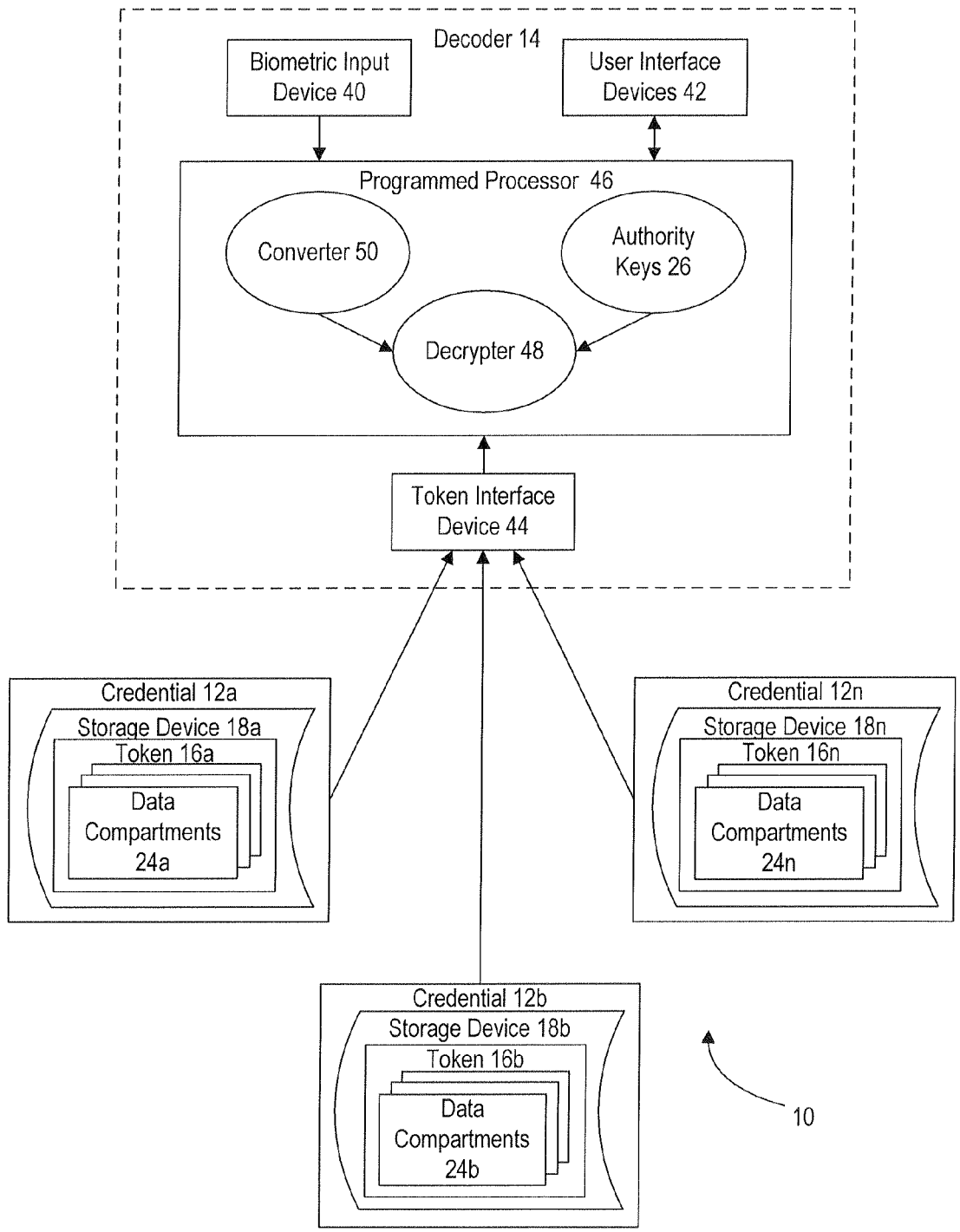
FIG. 1 is a block diagram of an identity authentication system according to a first example embodiment of the present invention, showing a decoder and three credentials.

With reference to the drawings figures, example embodiments of systems, components thereof, and methods according to the present invention will now be described. FIGS. 1-4 show an identity authentication system 10 according to a first example embodiment of the present invention. As shown in FIG. 1, the system 10 includes at least two components: at least one credential and at least one decoder. For clarity and illustrative purposes, the depicted system 10 includes one decoder 14 and three credentials 12a-n (sometimes referred to individually as the "credential 12" and collectively as the "credentials 12"). In typical commercial embodiments, the system 10 includes a plurality of the credentials 12, for example one per person, and a plurality of the decoders 14, for example one at each particular location where identity authentication is desired. Regardless of the number of components included, the system 10 of this embodiment is designed for use in applications where the user is physically present at the same location as one of the decoders 14. In these applications the identity authentication is referred to as done "locally" at, for example, a point-of-sale (POS) location, an access point for a secure perimeter, an airline passenger boarding gate, etc.

The credentials 12a-n store security tokens 16a-16n, respectively (sometimes referred to individually as the "token 16" and collectively as the "tokens 16"). As used herein, the term "token" 16 means an encrypted data file. The credentials 12 are physical objects that may be provided in any of a number of different forms. In typical commercial embodiments, for example, the credentials 12 are plastic (e.g., polyvinyl chloride (PVC)) cards, airline boarding passes, security passes, smart cards, mobile phones, personal digital assistants (PDAs), universal serial bus (USB) thumb drives, memory sticks, electronic keychain fobs, onetime writeable devices, rewriteable devices, and/or other portable electronic devices.

The credentials 12a-n include data storage devices 18a-n, respectively (sometimes referred to individually as the "storage device 18" and collectively as the "storage devices 18") that store the tokens 16a-n. For credentials 12 provided by airline boarding passes or some plastic cards (keychain-fob-sized cards, etc.), for example, the storage devices 18 may be optically scannable media such as printed barcodes. For credentials 12 provided some other plastic cards (wallet-sized cards, etc.), for example, the storage devices 18 may be magnetically scannable media such as magnetic stripes. And for credentials 12 provided by portable electronic devices such as mobile phones, PDAs, electronic keychain fobs, smart cards, USB thumb drives, and memory sticks, for example, the storage devices 18 may be processor-readable memory devices such as memory chips, flash memory devices, magnetic or optical drives, etc.

Such portable electronic device credentials 12 may also include conventional short-range wireless communication components for communicating with the decoder 14. For example, the credentials 12 may each include a transmitter, antenna, and controller for transmitting the token 16 to the decoder 14. Or the credentials 12 may include a transceiver instead of a transmitter for also receiving the token 16 when setting up the credential, receiving an updated token after the authentication, etc.

In embodiments in which the credential 12 is a mobile phone, PDA, or other portable wireless communications device, the existing wireless communication components of the credential may be used for communicating with the decoder 14, or the credential may include separate dedicated wireless communication components for communicating with the decoder. In addition, the credentials 12 having wireless communication components to communicate with the decoder 14 may be set up with a communications protocol such as BLUETOOTH, ZIGBEE, WI-FI, Near Field Communication (NFC), TCIP, or another wireless communication technology.

As mentioned above, the token 16 stored by the storage device 18 of the credential 12 is an encrypted data file. The data file is uniquely encrypted based on a biometric key that is in turn based on a biometric identifier that is unique to the user of the credential 12. The system 10 can be adapted to use biometric identifiers including fingerprints, handprints, irises, facial features, voice patterns, DNA, a combination thereof, and/or any other intrinsic physical or behavioral human traits. In particular, the system 10 can be adapted to use any biometric identifier for which there can be provided an input device 20 and conversion software 22 that converts the inputted biometric identifier into a biometric key. The biometric identifier input device 20 and the conversion software 22 are operably connected to or an integral part of the decoder 14, as described below. As used herein, the term "biometric key" means a unique, repeatable character string (e.g., numbers, letters, an alphanumeric combination, a series of other symbols, indicia, or special characters, or a combination thereof) that is generated from a biometric identifier and that can be used for encrypting the data file to form the token 16 and for decrypting and thereby opening the token. In other words, a biometric key is a unique digital representation of a unique biometric identifier.

Commercially available biometric input devices such as fingerprint scanners, handprint scanners, iris scanners, facial scanners, audio voice recorders, and DNA sampling devices can be used for inputting biometric identifiers such as fingerprints, handprints, irises, facial features, voice patterns, and DNA samples, respectively. In addition, there is commercially available conversion software (e.g., from GENKEY of Mountain View, Calif.) that converts a scanned-in fingerprint into a unique, repeatable number string that can be used as the biometric key. It will be understood by those of ordinary skill in this art that this conversion software can be adapted, or other conversion software can be provided, for converting other inputted biometric identifiers such as irises, facial features, and voice patterns into unique, repeatable character strings that can be used as the biometric keys. Accordingly, using currently available technology, the system 10 can be configured to use at least inputted fingerprints, irises, facial features, and/or voice patterns as the biometric identifier. In addition, it is believed to be well within the ability of persons of ordinary skill in the art to adapt the system 10 using currently available technology to provide for converting other inputted biometric identifiers (such as DNA and other intrinsic physical or behavioral human traits) into biometric keys.

The data encrypted in the token 16 may be any type of information that is relevant for the particular application. For example, the encrypted data includes user-specific information in an application where the credential 12 is a digital driver's license, application-specific information where the credential is an access card for a secure perimeter, and both user- and application-specific information in an application where the token is a universal identity card. Alternatively, the encrypted data may include information that is not specific to the user or the application (e.g., a random piece of data) in an authentication-only application. In an authentication-only application, all that is desired is to prove that the presenter of the credential 12 is the person to whom the credential was registered (access to the data does not need to be secured or used for any other purpose). In addition, the storage device 18 may store addition data that is not encrypted in the token 16, though such addition data is not secured. By storing all of the information on the credential 12 rather than in a central database, the value of each individual credential is reduced and the point of single of attack—the central database—is eliminated.

In applications in which only one piece or set of data is secured on the credential 12, the token 16 may consist of that single piece or set of data, encrypted. This configuration is suitable for an application such as a credit card where the secured data set includes the user's personal information (name, address, date of birth (DOB), social security number (SSN), etc.) and financial information (the credit card account number, expiration date, etc.).

In applications in which multiple pieces or sets of data are secured, the tokens 16a-n include a plurality of data compartments 24a-n (sometimes referred to individually as the "data compartment 24" and collectively as the "data compartments 24"). As used herein, the term "data compartments" 24 means digital storage locations in the token 16 that contain data that is encrypted additionally to the token encryption. Each data compartment 24 is uniquely encrypted independently of each other data compartment. This allows only certain decoders 14 (those that have been given the proper authorization, as described below) to access certain data compartments 24. This configuration is suitable for an application such as a universal identity card where the secured data includes the user's personal information, financial information, and medical history.

Each of the data compartments 24 is uniquely encrypted based on a unique authority key 26, and the entire token 16 (i.e., all of the data compartments) is encrypted based on the biometric key. As used herein, the term "authority key" means a unique character string (e.g., numbers, letters, an alphanumeric combination, a series of other symbols, indicia, or special characters, or a combination thereof) that corresponds to a unique authority level and that can be used for encrypting and decrypting the data compartments 24. The authority keys 26 are stored on the decoder 14, as described below.

The authority levels are based on the particular data in the tokens 16 that needs to be accessed by a particular decoder 14 in a particular application, and they are not necessarily hierarchical in nature. Because each data compartment 24 is encrypted with at least two keys—at least one authority key 26 for that data compartment and at least one biometric key for all the data compartments—even if a decoder 14 is hacked to obtain an authority key stored on it, the hacker still cannot open any data compartments of any tokens 16. In this way, each data compartment 24 is absolutely uniquely encrypted and can be accessed only by the authorized user (who has the correct biometric key) using an authorized decoder 14 (which has the correct authority key 26).

Figure 2:
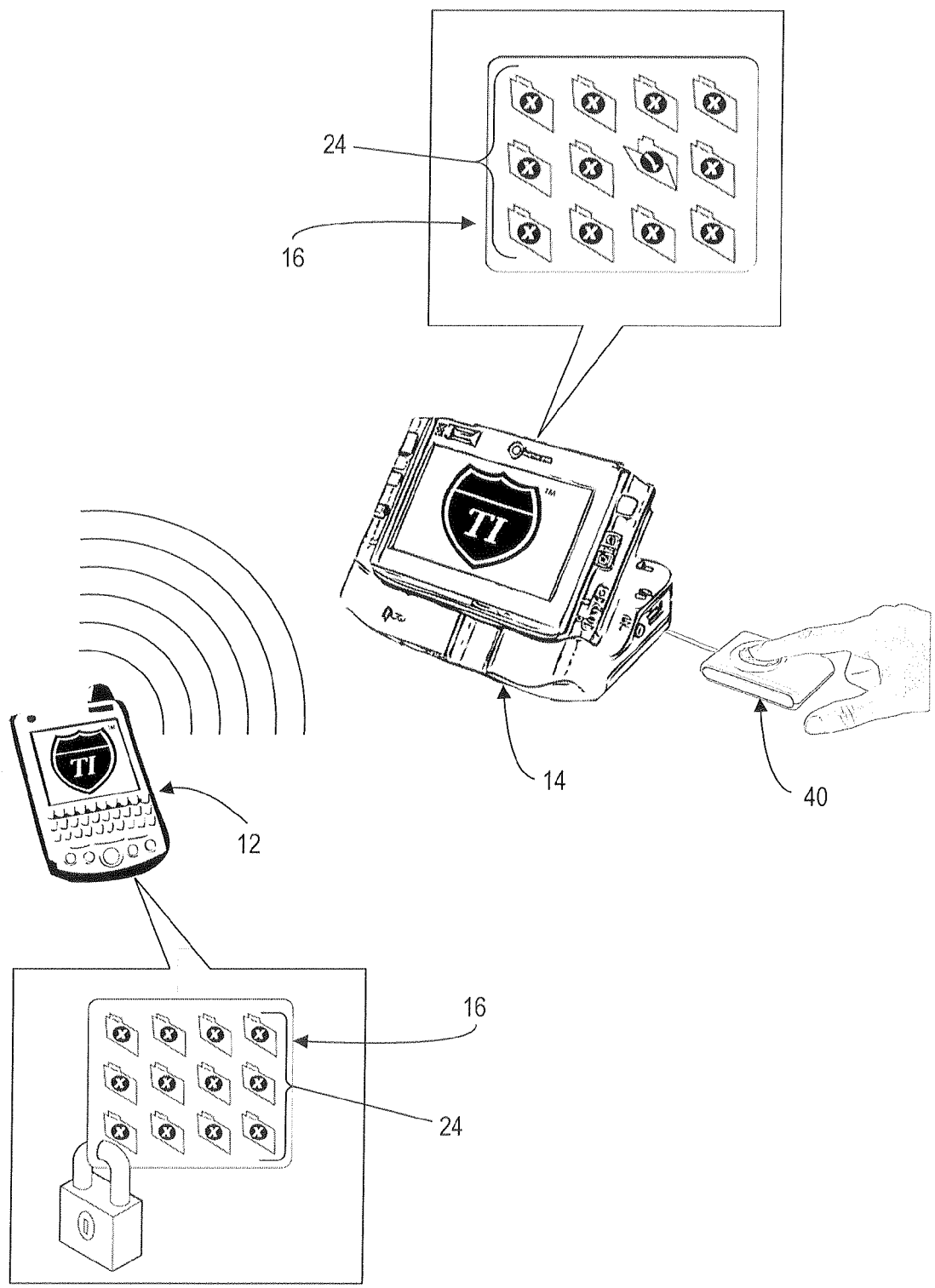
FIG. 2 is a conceptual block diagram of one of the credentials and the decoder of FIG. 1, showing the decoder having an authority key for opening only one data compartment of the credential's token.
Figure 3:
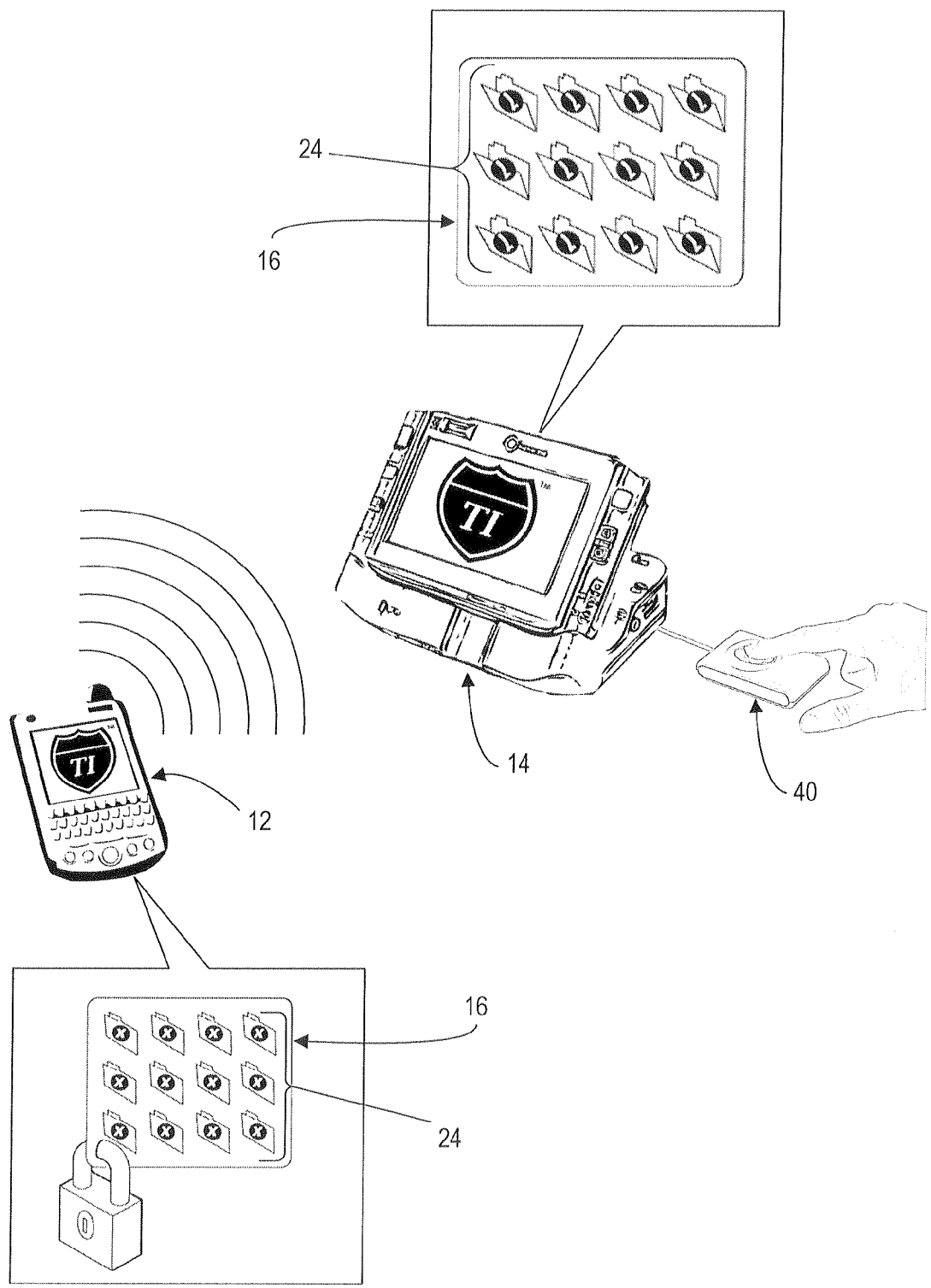
FIG. 3 is a conceptual block diagram of the credential and the decoder of FIG. 2, showing the decoder having another authority key for opening all of the data compartments of the credential's token.

For example, FIGS. 2 and 3 depict a digital driver's license application in which the credential 12 is a PDA-style mobile phone that stores driver's license information. Each piece of data is stored in its own data compartment 24a-n, each data compartment is encrypted based on it's own unique authority key 26, and all of the data compartments (i.e., the token 16) are collectively encrypted based on a unique biometric key of the authorized user. The data stored in the data compartments 24a-n is the same data on a conventional driver's license, for example, the user's name, address, gender, DOB, age, height, and weight, the DL number, the state of licensure, etc. A photograph of the user may even be stored in one of the data compartments 24, though this is not needed because the credential 12 is authenticated by the user presenting a different type of authenticator 3 (something the user is): a biometric identifier.

As depicted in FIG. 2, when the user presents the digital driver's license credential 12 to a retailer's decoder 14 and presents a preselected biometric identifier to a biometric input device 20 of the decoder for age verification for restricted purchases (e.g., purchasing alcoholic beverages), three things happen. The credential 12 is authenticated—if the biometric key opens the token 16, then the credential is authenticated because the token has been shown to have been created using the correct encryption algorithm. (Details of the token 16 creation and the decoder 14 construction are provided below.) The right of the user to access the data on the credential 12 is authenticated—the biometric key opening the token 16 also authenticates the user because the unique biometric key comes from the unique user. And if both of those are positive, then the user's age is verified—if strong authentication is achieved by the presentation of the credential 12 and the biometric identifier, then the retailer's decoder 14 uses its authority key and the biometric key (which it generates based on the inputted biometric identifier) to open and read the DOB data compartment of the token 16. Only one of the data compartments 24 (the one storing the DOB) is opened. No other data compartments 24, i.e., those storing the user's name, address, etc., can be accessed by this retailer's decoder 14. Because the authorized use of this decoder 14 is for verifying age and not for any other purpose, it was set up with an authority key to open only the DOB data compartment, and not any others.

As depicted in FIG. 3, however, decoders 14 for use by police officers are set up with a plurality (e.g., twelve) of authority keys to access all twelve of the depicted data compartments 24. So when the same driver's license credential 12 is presented to a police officer, his decoder 14 has the authority to access all of the data compartments 24 storing all of the driver's license data.

In other applications the credentials 12 are set up as credit cards storing the user's name and address, the credit card number, the credit card expiration date, etc., in individual data compartments 24. The decoders 14 for this application are set up for use in processing credit card payments. These decoders 14 store the authority keys needed for accessing the data compartments 24 storing the data needed to process the credit card transaction, and no other authority keys.

And in applications in which a credential 12 is set up for multiple uses (e.g., a universal personal identity card for personal identification, credit card purchasing, medical history, etc.), each stored piece or set of data is encrypted by a unique authority level. So the police officer's decoder and the retailer's decoder do not have authority keys that open the medical history data compartments.

In a typical commercial embodiment, each data compartment 24 stores a single piece of data and is uniquely encrypted with an authority key. The decoders 14 that are authorized to access a particular piece of data store the corresponding authority key that opens the data compartment 24 storing that piece of data. So in an application where access to only one piece of data is needed, the authorized decoders 14 store only the corresponding authority key that opens the data compartment 24 storing that one needed piece of data. And in applications where access to multiple pieces of data is needed, the authorized decoders 14 store all of the corresponding authority keys that open all of the data compartments 24 storing all of the needed pieces of data.

In an alternative embodiment for applications where access to multiple pieces of data is needed, each data compartment 24 stores multiple pieces of data (i.e., a data set) and is uniquely encrypted with an authority key. So for example one of the data compartments 24 stores driver's license data, another one stores credit card data, and another one stores medical data. The decoders 14 needing access to credit card data would have the corresponding authority key that opens that data compartment 24 but would not have the authority key that opens the data compartment storing all the user's medical history. In this embodiment, the same piece of data (e.g., the user's name and address) could be stored in multiple data compartments 24.

In another alternative embodiment for applications where access to multiple pieces of data is needed, each data compartment stores 24 a single piece of data and a set of the data compartments (collectively storing all the data needed for a certain application) are encrypted together with a single authority key. The authority key is stored on the authorized decoders 14 for that application. Of course, the data compartments 24 can be configured in other ways understood by persons of ordinary skill in the art to store and provide access to multiple pieces of data.

Before getting into the details of the decoder 14, a token set-up device and a method of setting up the tokens 16 will be described. The set-up device may be provided by a dedicated workstation or other processor-based electronic device, or its components can be combined into some or all of the decoders 14 so that only one type of device need be provided.

Figure 4:
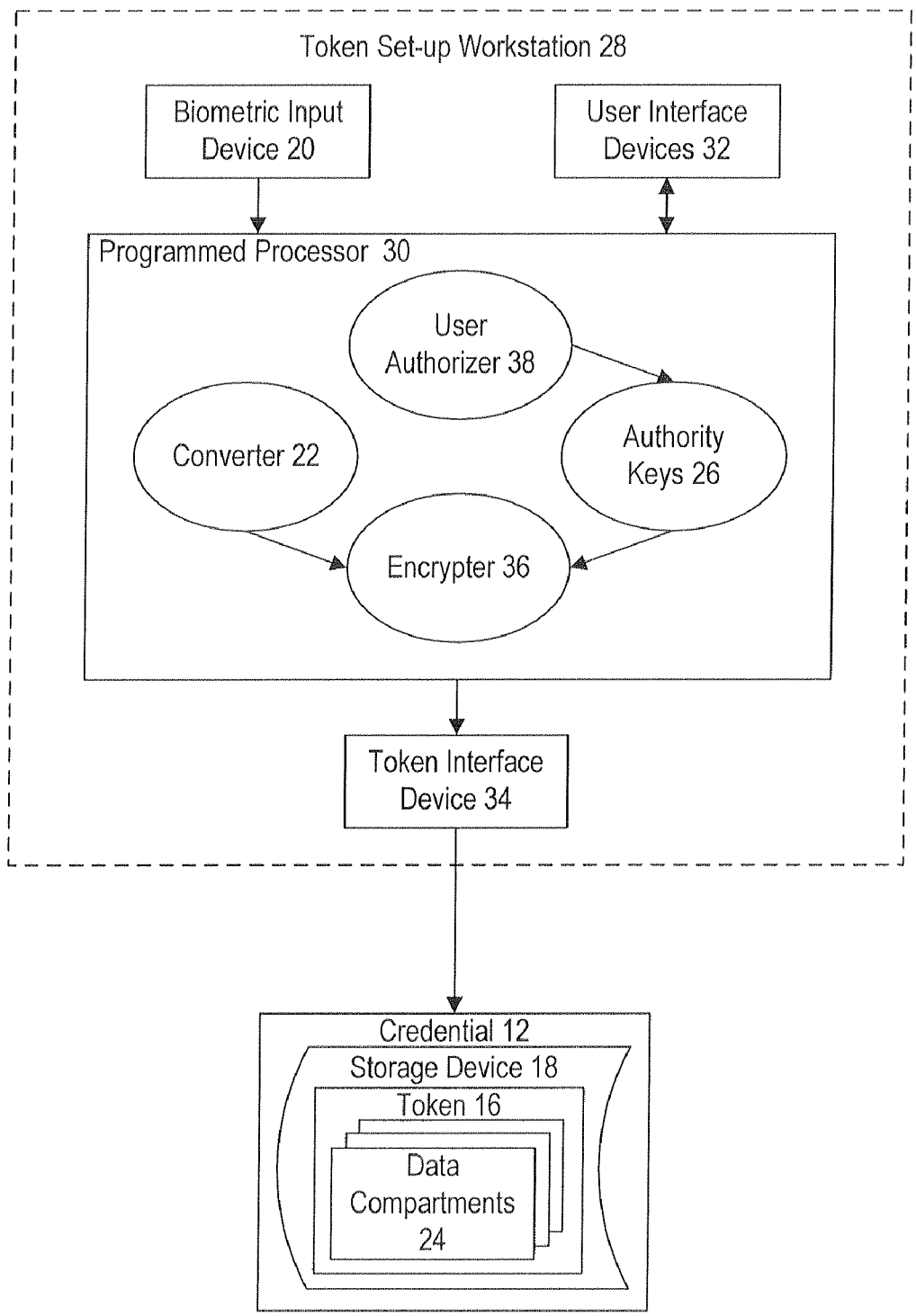
FIG. 4 is a block diagram of a token set-up workstation of the identity authentication system of FIG. 1.

FIG. 4 shows a token set-up workstation 28 of the identity authentication system 10. The workstation 28 includes at least one biometric input device 20, at least one user interface device 32, at least one token interface device 34, and a programmed-processor system 30. In typical commercial embodiments, the workstation 28 includes a fixed-medium data storage device (e.g., a magnetic disk drive), a removable-medium data storage device (e.g., a CD-ROM or DVD drive), and/or other components commonly used in computer workstations, which are not shown for purposes of clarity. The term "workstation" is used herein in a broad sense to include general purpose computers, computer kiosks, and the like. The biometric input device(s) 20, the user interface device(s) 32, and the token interface device(s) 34 may be provided as peripheral devices that operably connect (e.g., wirelessly or by wires) to the set-up device 28 or they may be integral components of the set-up device.

The biometric input device 20 may be provided by a fingerprint or handprint scanner, an iris scanner, a facial feature scanner, an audio voice recorder, a DNA sampling device, or another conventional device (e.g., a camera, a sonar or infrared device) for collecting a biometric identifier, as discussed above. In particular, the biometric input device 20 receives the biometric identifier by generating a digital template of it. The term "digital template" as used herein means a digital representation derived from and unique to the biometric identifier. For some biometric input devices 20 the digital template visually (or otherwise) resembles the biometric identifier, though this is not necessary for the system 10 to function properly. Suitable fingerprint scanners, handprint scanners, iris scanners, facial feature scanners, audio voice recorders, and DNA sampling devices are commercially available from numerous vendors. For applications in which the set-up workstation 28 is to be used for encrypting the tokens 16 based on more than one type of biometric identifier, the workstation may be provided with more than one type of biometric input device 20, for example, a fingerprint scanner and an iris scanner.

The user interface device 32 is typically provided by one or more input devices and one or more output devices. The input devices may be for example a touch screen, handwriting input screen, keypad, keyboard, data-entry buttons, pointing device (e.g., mouse), magnetic stripe scanner, and/or optical scanner. And the output devices may be for example a touch screen, a display screen, a speaker, and/or indicator lights.

The token interface device 34 selected for the set-up workstation 28 is based on the type of credential 12 and token storage device 18 used in a particular application. For example, for credentials 12 provided by airline boarding passes or some plastic cards (keychain-fob-sized cards, etc.) in which the storage media 18 is an optically scannable media such as a printed barcode, the token interface device 34 may be provided by a printer for printing the tokens 16 onto the credentials. For credentials 12 provided by some other plastic cards (wallet-sized cards, etc.) in which the storage devices 18 are magnetically scannable media such as magnetic stripes, the token interface device 34 may be provided by a magnetic stripe encoder for writing the tokens 16 onto the credentials.

For credentials 12 provided by portable electronic communication devices such as mobile phones and PDAs, in which the storage devices 18 are processor-readable memory devices that are wired to wireless communications components (e.g., an antenna, transmitter/transceiver, and controller) onboard the credential, the token interface device 34 may include wireless communications components such as an antenna, transmitter, and controller for wirelessly transmitting the tokens 16 to the credentials. Similarly, for credentials 12 provided by portable electronic devices such as electronic keychain fobs and processor smart cards (aka contactless chip cards) in which the storage devices 18 are processor-readable memory devices that are wired to wireless communications components (e.g., RFID components) onboard the credential, the token interface device 34 may include wireless communications components such as an antenna, transmitter, and controller for wirelessly transmitting the tokens 16 to the credentials. And for credentials 12 provided by portable memory-only devices such as USB thumb drives, memory sticks, and memory smart cards (aka contact-type chip cards) in which the storage devices 18 are processor-readable memory devices that are wired to a connector of the credential, the token interface device 34 may be provided by a connector that contacts and mates with the credential connector for electronic transmission of the tokens 16 to the credentials.

In applications in which the set-up workstations 28 have wireless communication components to communicate with wireless credentials 12, the workstations may be set up with a communications protocol such as BLUETOOTH, ZIGBEE, WI-FI, Near Field Communication (NFC), TCIP, or another wireless communication technology. And in applications in which the workstation 28 is used for setting up more than one type of credential 12, the workstation may be provided with more than one type of token interface device 34, for example, a printer for marking barcodes on plastic card credentials and communications components for transmitting the tokens to mobile phone credentials.

In alternative embodiments, the set-up workstations are configured not just to transmit the tokens 16 to the credentials 12 during the initial set-up process. Such alternative embodiments include set-up workstations that are configured to also receive tokens 16 from previously issued credentials 12, modify or update the tokens, and send them back to the credentials. Such workstations may include decryption software (not just encryption software), a receiver or transceiver as a component of the token interface device (instead of just a transmitter), a scanner as a token interface device (instead of just a printer), etc.

The programmed-processor system 30 stores and/or can otherwise access software elements including the conversion software 22, the authority keys 26, and encryption software 36. Although not shown individually for purposes of clarity, programmed processor system 30 includes one or more processors, memories, and/or other logic that together define the overall processing power of the workstation 28. As persons skilled in the art can appreciate, the software elements are shown in a conceptual manner for purposes of illustration and may not reside in memory simultaneously or in their entireties. Rather, in the manner in which computers are known to operate, the software elements or portions thereof can be retrieved on an as-needed basis from memory chip, a fixed-medium local drive, a removable-medium local drive, and/or a network-connected remote computer or storage device. In addition, the functions of the software elements can be distributed over a greater number of software elements or combined/condensed into fewer elements. Additional software elements commonly included in computing systems, such as an operating system, a graphical user interface, utilities, interface device drivers, etc., may be included but are not shown for purposes of clarity. In view of the descriptions herein, persons skilled in the art will be readily capable of providing suitable software and otherwise programming or configuring workstation 28 to perform the token set-up methods described below.

The conversion software 22 converts the biometric identifier digital template from the biometric input device 20 to the biometric key, as discussed above. The conversion software 22 may be a commercially available version (e.g., the fingerprint conversion software from GENKEY of Mountain View, Calif.) or an adapted version of commercially available software.

The stored authority keys 26 include all of the authority keys for all of the authority levels of the particular application. In applications in which the tokens 16 include only a single piece or set of data and no authority levels are set up, the tokens 16 are not set up with the dedicated data compartments 24. In such applications, the workstations 28 need not store or have access to the authority keys 26.

The encryption software 36 uses a cryptographic algorithm to individually encrypt each of the data compartments 24 based on its corresponding authority key and to collectively encrypt all of the data compartments (i.e., the entire token 16) based on the selected biometric key of the authorized user. The encryption software 36 may be provided by cryptographic software that uses a cryptographic algorithm such as the Advanced Encryption Standard (AES), SHARK, TWOFISH, BLOWFISH, or another public domain or proprietary encryption algorithm. Suitable cryptographic software is commercially available from a number of vendors including RSA Security Inc. (Bedford, Mass.) and PGP Corporation (Menlo Park, Calif.). In the depicted embodiment the encryption software 36 uses the same cryptographic algorithm to individually encrypt the data compartments 24 and to collectively encrypt the data compartments to form the token 16. In alternative embodiments the programmed-processor system 30 uses different cryptographic algorithms for the individual and collective encryptions and/or different cryptographic algorithms for some or all of the data compartment encryptions.

In addition, the software elements stored on and/or accessible by the programmed-processor device 20 may include user-authorization software 38. The user-authorization software 38, using the user interface devices 32 to interface with the user and an Internet interface (not shown) to access remote-stored data, prompts a new (to-be-authorized) user to provide inputs (e.g., answers to questions only the true-identity person would know) and analyzes the inputs to determine whether the person is actually who he/she says. The user-authorization software 38 may be provided by programs that are commercially available (e.g., under the brand SIGNIX, by SUNGARD DATA SYSTEMS INC. of Wayne, Pa., offered by the credit bureaus, or other digital signing software). Such user-authorization software 38 is automated to authenticate the new user as an authorized user, without the intervention or assistance of a human. In embodiments including the user-authorization software 38, the workstations may be provided as self-service kiosks on-site at the authorizing and token issuing organization or dispersed in remote locations. In embodiments without the user-authorization software 38, the user authorization can be done by traditional methods known in the art.

In an alternative embodiment, a set-up workstation is configured and programmed for encrypting the data to form the tokens, but is not configured for first encrypting any data compartments. The set-up workstation of this embodiment is suitable for use in applications in which there is only one piece or set of data to be secured, and that data or dataset is encrypted based on a biometric key to form the token. So the set-up workstation has no authority keys and sets up no data compartments. Of course, in applications in which there is only one piece or set of data to be secured, the workstations still can be configured for first encrypting that one piece or set of data in a data compartment based on an authority key and then encrypting that one data compartment based on a biometric key.

In other alternative embodiments, set-up workstations are configured and programmed for encrypting tokens based on more than one biometric identifier. For example, a workstation may be provided with two (or more) different biometric input devices, for example, a fingerprint scanner and an iris scanner. In some such applications, the set-up workstations are set up so that a first user can select (e.g., from a menu displayed on a user interface display device) one biometric input device for inputting his biometric identifier and a second user can select a different biometric input device for inputting his biometric identifier. In some other such applications, the workstations are set up so that one user can select (e.g., from a menu displayed on a user interface display device) two biometric input devices for inputting two desired biometric identifiers. The workstation converts the second biometric identifier to a second biometric key, encrypts the data compartments based on the second biometric key and the authority keys in a two-part process, and then encrypts all of the data compartments based on the first biometric key. And in a similar alternative embodiment, a workstation is set up to encrypt the data compartments in a two-part process based on the authority keys and the same biometric key used for the token creation.

Accordingly, the workstations can be configured to set up the tokens using one or more biometric keys to encrypt the data compartments in at least three different modes. In all three modes, one biometric key is used to encrypt the token (all of the data compartments collectively) and one or more authority keys are used to encrypt the data compartments. The three modes for additionally encrypting the data compartments with a biometric key are (1) encrypting each of the data compartments with the same biometric key used for encrypting the token; (2) encrypting each of the data compartments with a different biometric key from the biometric key used for encrypting the token; and (3) encrypting each of the data compartments with its own dedicated biometric key. For example, in mode (2) a right index fingerprint can be used to encrypt the token and a left index fingerprint can be used to encrypt all of the data compartments and an example of mode (3) is a right index fingerprint used to encrypt the token, a left index fingerprint used to encrypt the "name" data compartment; a right ring fingerprint used to encrypt the "SSN" data compartment; and a left ring fingerprint used to encrypt the "driver's license" data compartment.

Having described example embodiments of a token set-up workstation 28, methods of setting up the tokens 16 now will be described. Generally described, the set-up methods include inputting data into a data compartment 24, encrypting the data compartment based on a corresponding authority key, receiving a user-inputted biometric identifier, generating a biometric key from the inputted biometric identifier, encrypting all of the data compartments based on the biometric key to create the token 16, and transferring the token to the credential 12. It will be understood that the set-up methods can be carried out using the set-up workstation 28 just described, using a decoder 14 adapted to include the needed components and programming for setting up the tokens, or using other similar devices having similar components for performing the recited steps. For convenience, the set-up method will be described in conjunction with describing the use and programming of the set-up workstation 28 of FIG. 4 to set up a token 16.

Figure 5:
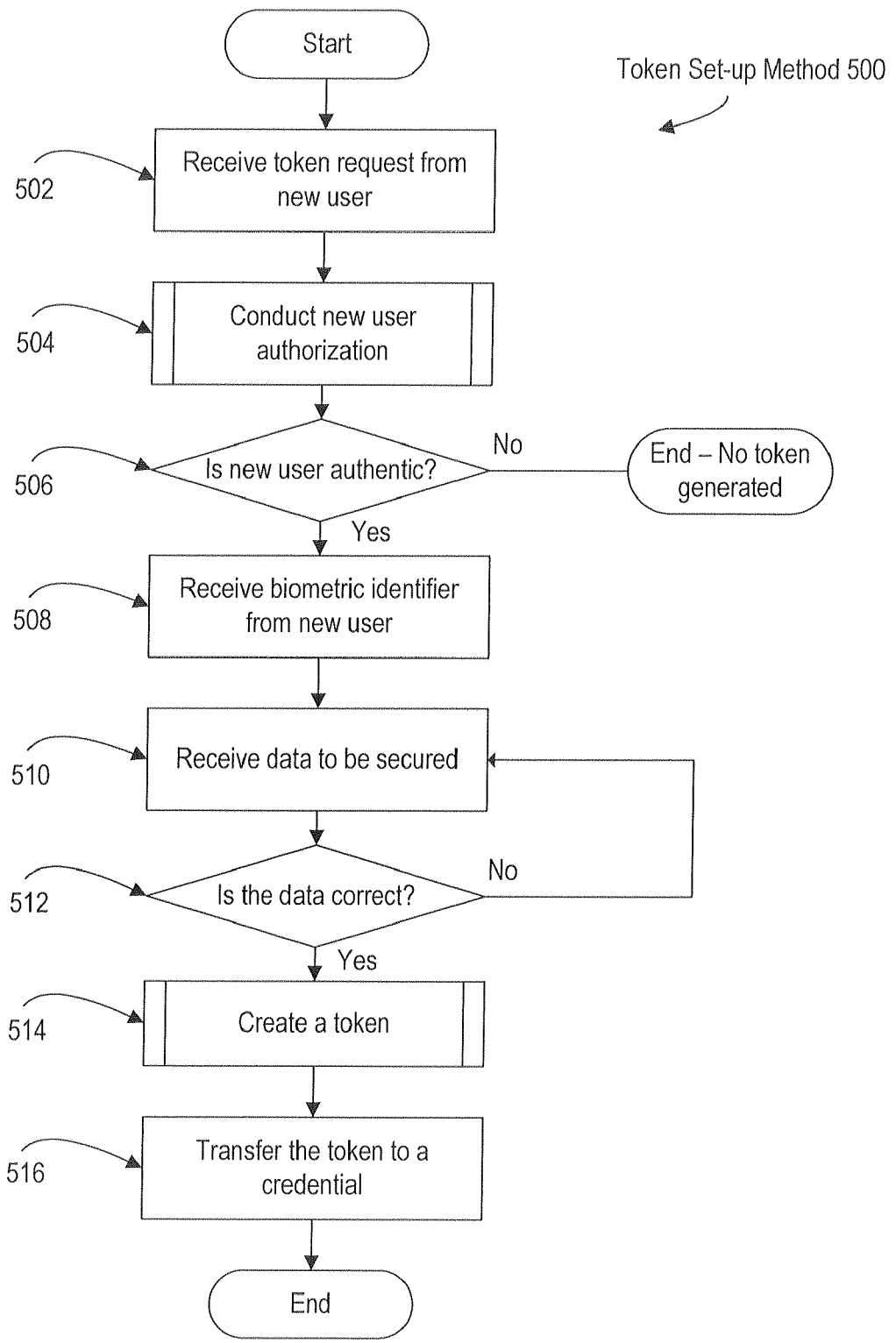
FIG. 5 is a flow diagram of a token set-up method using the token set-up workstation of FIG. 4.

FIG. 5 shows an example token set-up method 500 of the present invention. The method 500 starts at step 502 upon receiving a request from a new user desiring a token 16. The new user will typically use the user interface devices 32 to enter the request into the set-up workstation 28. The request typically includes one or more pieces of identifying data (full legal name, nicknames/aliases, SSN, DOB, current address, etc.) of the new user. The request can additionally include other information that may be useful for registering the new user.

In response, at step 504 a new user authorization process is conducted. When using a set-up workstation 28 including user-authorization software 38 (e.g., such as that provided by SUNGARD DATA SYSTEMS INC. under the brand SIGNIX), the workstation prompts the new user via the user interface devices 32 to provide identity inputs. For example, the workstation 28 can query the new user via the user interface devices 32 with a series of questions that are selected because only the authentic person is likely to know the correct answers. Such questions could include: "what was your address ten years ago?", "what was the name of your first dog?", "what was the name of your high school principal?" etc. In typical commercial embodiments, the workstation 28 accesses the Internet (or another global communications network) via a network interface to search for obscure data relating to the new user based on the inputted identifying data, and formulates the questions based on the obscure data found. In any event, the workstation 28 then receives the user identity inputs (e.g., the answers to the questions asked) via the user interface devices 32 and analyzes the inputs (e.g., compares them to the obscure data found) to determine whether the person is actually who he/she says. Additionally or alternatively, the workstation 28 can query the new user via the user interface devices 32 with a request for the new user to input via the user interface devices 32 (e.g., a scanner) certain user-identifying evidence such as a state-issued driver's license, a passport, a utility bill, etc. By providing the workstation 28 with the user-authorization software 38, the new user authentication process is automated and can be done without the intervention or assistance of a human (or with only minimal human intervention or assistance).

When using a set-up workstation 28 without user-authorization software 38, the user authorization process can be done by traditional methods known in the art. Such conventional methods include manually (i.e., by a human) examining user-identifying evidence received from the new user. Such user-identifying evidence may be documents issued by a government or other authority including a driver's license, social security card, passport, or employment license. Or such user-identifying evidence may be a biometric identifier in instances where the biometric identifier is already held by a government or other authority.

Upon the completion of the new user authorization process, if the new user is not authenticated then at step 506 the method 500 ends and no token is generated. If the new user has been authenticated, then at step 508 the workstation 28 queries the now-authorized user via the user interface devices 32 to enter at least one biometric identifier and receives the biometric identifier via the biometric interface device 20. The biometric interface device 20 generates a unique digital template of the biometric identifier. Preferably, the biometric identifier digital template is only temporarily stored (or is not stored at all) on the workstation 28, to avoid privacy concerns. As discussed above, the biometric identifier may be a fingerprint, handprint, iris print/scan, voice print, DNA sample, and/or a combination thereof, and/or any other intrinsic physical or behavioral human trait that is unique to that person.

Next, at step 510 the workstation 28 receives the data that is to be secured in the token 12. For example, the workstation 28 can be configured to query the user via the user interface devices 32 and receive the data from the user via the user interface devices. Additionally or alternatively, the workstation 28 can access the identifying data received from the user in the token request at step 502 (where some or all of the identifying data is the data to be secured). As discussed above, the data may be any type of data that is relevant to the particular application, including user-specific information, application-specific information, or other information. It should be noted that the authorization step 504, the biometric identifier input step 508, and the data input step 510 need not be performed in the described sequence.

At step 512, the workstation 28 queries the user via the user interface devices 32 to confirm that the data is accurate. For example, a listing of the data as is was received by the workstation 28 can be displayed to the user so that the user has the opportunity to correct any typographical errors, complete any incomplete data fields, etc. If the data is not complete and correct, then the method 500 returns to step 508 and the workstation 28 receives the corrected information from the user via the user interface devices 32.

If the information is correct and complete, then at step 514 a token 16 is created. Details of the token creation step 514 are provided below with respect to FIG. 6. Finally, the workstation 28 transfers the token 16 to a credential 12 via the token interface device 34, and the method 500 is completed. The result is a credential 12 with a token 12 containing data that can only be accessed by a decoder 14 that is presented with the token and the biometric identifier of the authorized user.

Figure 6:
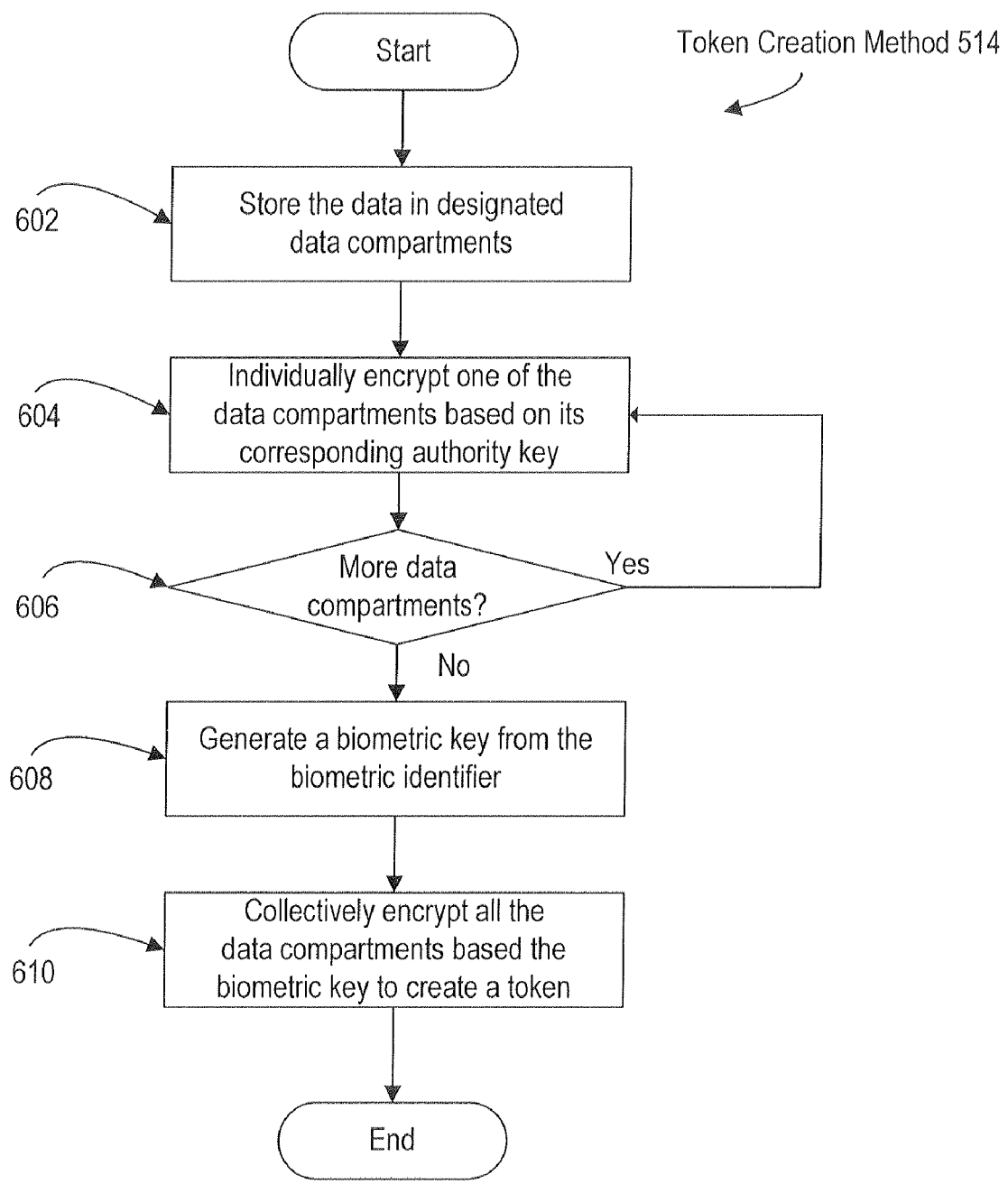
FIG. 6 is a flow diagram of a token creation method of the set-up method of FIG. 5.

FIG. 6 shows details of the token creation step 514. The method 514 starts at step 602 by storing each piece or set of the data in a data compartment 24 that corresponds to that type of data. As discussed above, each data compartment 24 may store a single piece of data or a set of data (e.g., user financial or medical data) that is selectively grouped together for use in a particular application.

At step 604 the workstation 28 uses the encryption software 36 to encrypt one of the data compartments 24 based on a predetermined authority key 26 for that data compartment. As discussed above, each of the authority keys 26 corresponds to an authority level, and in some applications there may be numerous different authority levels. For example, one authority level (and its corresponding authority key 26) can be for accessing a predetermined financial data compartment 24 (e.g., storing credit card account data) and another authority level (and its corresponding authority key) can be for accessing a predetermined medical history data compartment. As another example, a first authority level (and its corresponding authority key 26) can be for opening a predetermined first security clearance data compartment 24 (e.g., storing random data), the opening of which indicates that the user has been authorized to enter a first secured area. And a second authority level (and its corresponding authority key) can be for opening a predetermined second security clearance data compartment (e.g., storing random data), the opening of which indicates that the user has been authorized to enter the second secured area.

If there are more data compartments 24 to be encrypted, then at step 606 the method 514 returns to and repeats the data compartment encryption step 604. Once all of the data compartments 24 have been individually encrypted based on their corresponding authority keys 26, the method 514 proceeds to step 608.

At step 608 the workstation 28 uses the conversion software 22 to convert the biometric identifier digital template from step 508 into a biometric key. And at step 610 the workstation 28 uses the encryption software 36 to collectively encrypt all of the data compartments 24 based on the biometric key, thereby creating a token 12.

In the example token creation method 514 just described, the inputted data is initially (and preferably only temporarily) stored in data compartments 24 of a data storage device of the set-up workstation 28. After the data compartments 24 have been individually and collectively encrypted to create the token 16, the token is loaded onto the credential 12. In alternative methods, the inputted data is initially transferred to and stored in data compartments 24 of the storage device 18 of the credential 12. Then the data compartments 24 are individually encrypted and saved over the unencrypted data compartments on the credential 12. And then the encrypted data compartments 24 are collectively encrypted to create the token 16, which is then saved over the individually encrypted data compartments 24 on the credential 12.

In an alternative token creation method in which there is only one piece or set of data to be secured, no data compartments or authority keys are used. In particular, at step 602 the data is not stored in a data compartment 24, steps 604 and 606 are eliminated because there are no data compartments, and at step 610 the data is encrypted based on the biometric key. This alternative method is suitable for use in applications in which a less secure, more public token 12 is desired, because no authority keys are needed to access the data. Even with this alternative method the created token 16 is completely autonomous, allowing for user authentication and data transfer without connecting to a central server or database.

Another alternative method includes the steps of receiving a second biometric identifier, converting the second biometric identifier into a second biometric key, and using the second biometric key to additionally encrypt the token 12. For example, the second biometric key and a first authority key 26 can be used to sequentially encrypt a first data compartment 24, the second biometric key and a second authority key used to sequentially encrypt a second data compartment, and then the first biometric key used to encrypt both of the data compartments to form the token 16. This alternative method is suitable for use in applications in which a more secure, more private token 12 is desired, because two (or more) biometric identifiers (of the same or different type) are needed to access the data.

Referring back to FIG. 1, the decoder 14 will now be described in detail. The decoder 14 includes at least one biometric input device 40, at least one user interface device 42, at least one token interface device 44, and a programmed-processor system 46. In typical commercial embodiments, the decoder 14 includes a random access memory (RAM) data storage device and/or other components commonly used in processor-based devices, which are not shown for purposes of clarity. The biometric input device(s) 40, the user interface device(s) 40, and the token interface device(s) 44 may be provided as peripheral devices that operably connect (e.g., wirelessly or by wires) to the decoder 14 or they may be integral components of the decoder.

The biometric input device 40 may be of the same or a similar type as the biometric input device 20 of the set-up workstation 28. Thus, the biometric input device 40 may be a fingerprint or handprint scanner, an iris scanner, a facial feature scanner, an audio voice recorder, a DNA sampling device, or another conventional device (e.g., a camera, a sonar or infrared device) for collecting a digital template of the biometric identifier, as discussed above. For applications in which the decoder 14 is to be used for decrypting tokens 16 that were encrypted based on more than one type of biometric identifier, the decoder may be provided with more than one type of biometric input device 40, for example, a fingerprint scanner and an iris scanner. In some such applications, one token 16 is encrypted based on one biometric identifier and another token is encrypted based on a different biometric identifier, and the decoders 14 are configured and programmed so that the user can select (e.g., from a menu displayed on a user interface display device 42) the appropriate one of the biometric input devices 40 for inputting that particular biometric identifier for the decrypting. And in other such applications, one token 16 is encrypted based on two different biometric identifiers, and the decoders 14 are configured and programmed for first decrypting the token based on one biometric identifier from one of the biometric input devices 40 and for then decrypting the once-decrypted token based on the other biometric identifier from the other one of the biometric input devices 40. It will be understood that the decoder 14 can be configured and programmed for decrypting tokens 16 and data compartments 24 that have been encrypted with two or more biometric keys, for example, in any of the three modes described above with respect to the token set-up workstation 28.

The user interface device 42 is typically provided by one or more input devices and one or more output devices. The input devices may be for example a touch screen, handwriting input screen, keypad, keyboard, data-entry buttons, pointing device (e.g., mouse), magnetic stripe scanner, and/or optical scanner. And the output devices may be for example a touch screen, a display screen, speaker, and/or indicator lights. In the depicted embodiment of FIGS. 2 and 3, for example, the decoder 14 includes data-entry buttons as the user input device and an LCD or LED display screen as the user output device.

The token interface device 44 selected for the decoder 14 is based on the type of credential 12 and token storage device 18 used in a particular application. Typically, the token interface device 44 is also selected to correspond to the token interface device 34 of the set-up workstation 28. Thus, for credentials 12 provided by airline boarding passes or some plastic cards (keychain-fob-sized cards, etc.) in which the storage media 18 is an optically scannable media such as a printed barcode, the token interface device 44 may be provided by an optical scanner for reading the barcodes or other optically scannable media. For credentials 12 provided by some other plastic cards (wallet-sized cards, etc.) in which the storage devices 18 are magnetically scannable media such as magnetic stripes, the token interface device 44 may be provided by a magnetic reader for reading the magnetic stripes or other magnetically scannable media (i.e., by "swiping" the card).

For credentials 12 provided by portable electronic communication devices such as mobile phones and PDAs, in which the storage devices 18 are processor-readable memory devices that are wired to wireless communications components (e.g., an antenna, transmitter/transceiver, and controller) onboard the credential, the token interface device 44 may include wireless communications components such as an antenna, receiver, and controller for wirelessly receiving the tokens 16 from the credentials. Similarly, for credentials 12 provided by portable electronic devices such as electronic keychain fobs and processor smart cards (aka contactless chip cards) in which the storage devices 18 are processor-readable memory devices that are wired to wireless communications components (e.g., RFID components) onboard the credential, the token interface device 44 may include wireless communications components such as an antenna, receiver, and controller for wirelessly receiving the tokens 16 from the credentials. And for credentials 12 provided by portable memory-only devices such as USB thumb drives, memory sticks, and memory smart cards (aka contact-type chip cards) in which the storage devices 18 are processor-readable memory devices that are wired to a connector of the credential, the token interface device 44 may be provided by a connector that contacts and mates with the credential connector for electronic receiving the tokens 16 from the credentials.

In applications in which the decoders 14 have wireless communication components to communicate with wireless credentials 12, the decoders may be set up with a communications protocol such as BLUETOOTH, ZIGBEE, WI-FI, Near Field Communication (NFC), TCIP, or another wireless communication technology. And in applications in which the decoder 14 is used for opening more than one type of credential 12, the decoder may be provided with more than one type of token interface device 44, for example, an optical scanner for reading barcodes on plastic card credentials and communications components for wirelessly receiving the tokens from the mobile phone credentials.

The programmed-processor system 46 stores and/or can otherwise access software elements including the conversion software 50, the authority keys 26, and decryption software 48. Although not shown individually for purposes of clarity, programmed processor system 46 includes one or more processors, memories, and/or other logic that together define the overall processing power of the decoder 14. As persons skilled in the art can appreciate, the software elements are shown in a conceptual manner for purposes of illustration and may not reside in memory simultaneously or in their entireties. Rather, in the manner in which computers are known to operate, the software elements or portions thereof can be retrieved on an as-needed basis from a data storage device (e.g., an onboard RAM chip, fixed-medium local drive, or removable-medium local drive, and/or a network-connected remote computer or storage device). In addition, the functions of the software elements can be distributed over a greater number of software elements or combined/condensed into fewer elements. Additional software elements commonly included in computing systems, such as an operating system, a graphical user interface, utilities, interface device drivers, etc., may be included but are not shown for purposes of clarity. In view of the descriptions herein, persons skilled in the art will be readily capable of providing suitable software and otherwise programming or configuring the decoder 14 to perform the token opening methods described below.

The conversion software 50 converts the biometric identifier digital template from the biometric input device 40 to the biometric key, as discussed above. The conversion software 50 may be of the same or a similar type as the conversion software 22 of the set-up workstation 28. Thus, the conversion software 50 may be a commercially available version (e.g., the fingerprint conversion software from GENKEY of Mountain View, Calif.) or an adapted version of commercially available software.

The authority keys 26 stored on the decoder 14 include only those authority keys corresponding to the authority level assigned to that particular decoder. The authority levels 26 are each associated with a different predetermined data compartment 24 (or set of data compartments) storing data needed by the users of certain decoders in different applications, and they are not necessarily hierarchical in nature. Thus, each decoder 14 has at least one authority key 26 that it applies to tokens 12 presented to it to open the data compartments 24 storing the data needed by the users of that particular decoder.

In some applications the decoders 14 store more than one authority key 26. For example, two decoders 14 might each store a first authority key 26 that allows each decoder access to a first particular data compartment 24 of both of the tokens 16 (e.g., each first data compartment storing a corresponding one of the users' names). And those two decoders might additionally have some different authority keys 26. So a first one of the decoders might also store a second authority key 26 that allows it to access a second data compartment (e.g., storing credit card information) and the second one of the decoders might not have that authority key. But the second decoder 14 might also store a third authority key 26 that allows it to access a third data compartment (e.g., storing medical information) and the first decoder might not have that authority key.

In addition, for some applications in which the tokens 16 include only a single piece or set of data and no authority levels are set up, the tokens 16 are not set up with the dedicated data compartments 24. Instead, the single piece or set of data is encrypted based on a biometric key to form the token 16 without first encrypting the data or dataset based on an authority key. In such applications, the decoders 14 need not store or have access to any of the authority keys 26.

In some other applications, one decoder 14 may be used for multiple purposes. For example, a medical office might need to access a patient's medical records to provide certain medical services and also access the patient's credit card account information to get paid for the medical service rendered. For such applications, the decoders 14 are provided with multiple authority keys or keysets 26 and display (e.g., via a user interface display device) a menu for selecting the data to be accessed. Then the decoder 14 takes only the authority key or keyset 26 corresponding to the selected data and applies it to the corresponding data compartment(s) to access the selected data.

The decryption software 48 uses a cryptographic algorithm to collectively encrypt all of the data compartments 24 (i.e., the entire token 16) based on the selected biometric key of the authorized user and to individually decrypt each of the data compartments for which the decoder has the corresponding authority key. The decryption software 48 may be of the same or a similar type as the encryption software 36 of the set-up workstation 28. Thus, the decryption software 48 may be provided by cryptographic software that uses a cryptographic algorithm such as the Advanced Encryption Standard (AES), SHARK, TWOFISH, BLOWFISH, or another public domain or proprietary encryption algorithm. Suitable cryptographic software is commercially available from a number of vendors including RSA Security Inc. (Bedford, Mass.) and PGP Corporation (Menlo Park, Calif.). In an alternative embodiment, the decryption software 48, as well as the encryption software 50, has two different cryptographic algorithms, one for individually encrypting the data compartments 24 and another one for collectively encrypting all of the data compartments to form the token 16. In other alternative embodiments, the decryption software 48 and the encryption software 50 each have multiple cryptographic algorithms for securing and opening some or all of the data compartments 24.

In the depicted embodiment, the data compartments 24 cannot be opened without both the correct decoder authority key 26 and the correct user biometric key. So hacking a decoder 14, for example a police officer's decoder, exposes no data whatsoever. Because the decoder 14 has access to only one key (the authority key), the decoder does not have the capability to open any of the data compartments 24 by itself. The decoder 14 can only apply the unique biometric key (which it generates based on the biometric identifier inputted into it) and the authority keys 26 it holds to open the data compartments 24 and access the data stored in them. This is distinct from conventional smart card readers (e.g., for credit card transactions), which have the ability to access the data being secured, whether the data is stored on a token the decoder reads or in a database it accesses, before and as a requirement of performing the authentication, and this presents an opportunity for hackers to steal the data.

In addition, a hacker could not put a "false front" on the decoder 14 to capture a user's inputted biometric identifier and then convert that to the biometric key. This is because the hacker would not have the proper conversion software to convert the biometric identifier to the biometric key, and the hacker would not have the proper decryption software to apply the key. Thus, just stealing the authority key 26 or the biometric identifier, or both, is not enough to open the token 16 or any of the data compartments 24.

In an alternative embodiment the decoder 14 is further protected from hacking by requiring a biometric identifier be received by the decoder in order for it to access the decryption software it needs to decrypt the token 16. As discussed above, the token set-up workstation 28 uniquely encrypts each token 16 with encryption software 48 using a cryptographic algorithm and with a biometric key it generates from a biometric identifier received from the user. And the decoder 14 decrypts the tokens 16 with decryption software 50 using the same cryptographic algorithm. In this alternative embodiment, however, the decryption software 50 stored on the decoder 14 is only accessible upon the decoder receiving a predetermined biometric identifier of the user. The decoder 14 can be configured so that the decryption software 50 is accessed upon the entry of the same biometric identifier used for opening the token 16 or so that it is only accessed upon the entry of a different biometric identifier. For embodiments in which different types of biometric identifiers are entered, the decoder 14 may include two different types of biometric input devices 40 (one for each biometric identifier type). If both required biometric identifiers are of a type that the user has multiple of (e.g., ten fingerprints, left and right handprints, left and right iris prints, etc.), the same biometric input device 40 can be used for entering both of them. In this way, the decoder 14 uses one inputted biometric identifier to access the decryption software needed to open the token 16. Then the decoder 14 uses the same or an additional inputted biometric identifier to generate the biometric key for applying the decryption software. This provides an extreme level of security because there is nothing to hack. In an example embodiment, the biometric identifier could be converted into a unique repeatable number and then used as a "seed" to determine the actual algorithm used in the encryption process. In another example embodiment, the decoder could have a plurality of encryption algorithms stored in it, and the biometric identifier could be converted in a unique repeatable number in order to select which algorithm is used. For instance, the biometric key could be used by determining whether the number is even or odd to select which algorithm is used. Or the biometric key could be used by multiplying it by another number or inserting it in a formula, calculating the result, and based on the result determining the algorithm used to encrypt the token.

In another alternative embodiment, all of the software, including the conversion and decryption software as well as the operating system and processing software, is combined into a single chip that further prevents hacking of the decoder. In other words, instead of some or all of the software elements residing on a disk that could be possibly hacked or monitored to learn how the software works, the software elements all reside on a single chip in the decoder. In this way, the processing of the software, the processing of the biometric key, the processing of the token, etc. all occurs on a single chip with no chance for outside monitoring of what is going on. So a hacker cannot just "watch" the process to learn how it works—there is nothing to watch on a single chip because there is only data in and data out of the chip.

And in yet another alternative embodiment, the security is layered with two biometric keys, one to encrypt/decrypt the token and the other (along with the authority keys) to encrypt/decrypt the data compartments. By using two different cryptographic algorithms, the same biometric identifier (and the same biometric input device) can be used to generate two unique biometric keys to secure the token and the data compartments. It will be understood that the present invention contemplates and is intended to include other embodiments in which the security is layered by other similar methods to make the system more secure.

In the depicted embodiment, the decoder 14 is built and configured with components only for locally opening the tokens 16. In alternative embodiments, decoders are built and configured with components for locally opening the tokens 16 and for also initially setting up the tokens and/or updating the tokens. In alternative embodiments in which the decoders also initially set up the tokens 16, the decoders encrypt the tokens and load them onto the credentials 12. And in alternative embodiments in which the decoders also update the tokens 16, the decoders update the data, re-encrypt the tokens, and load them back onto the credentials 12. Such alternative decoders may include encryption software (not just decryption software), a transmitter or transceiver as a component of the token interface device (instead of just a receiver), a printer as a token interface device (instead of just a scanner), etc.

In yet another alternative embodiment, the decoder 14 includes a network interface device (not shown) for connecting to a network such as the internet. The network interface device may be an integral component of the decoder 14 or it may be a separate component that is operably connected (wirelessly or by wires) to the decoder. The network interface device permits the decoder 14 to communicate with other devices such as a local or remote POS device, perimeter access control equipment including for example a door or gate, a remote server, etc.

Having described example embodiments of a decoder 14, methods of using the decoders to open the tokens 16 now will be described. Generally described, the token-opening methods include receiving a token 16 and a biometric identifier from a user. Then the decoder 14 converts the user's biometric identifier to a biometric key and applies the biometric key to decrypt and thereby open the uniquely encrypted token 16. It will be understood that the token-opening methods can be carried out using the decoder 14 just described, using a workstation 28 adapted to include the needed components and programming for opening the tokens, or using other similar devices having similar components for performing the recited steps. For convenience, the token-opening methods will be described in conjunction with describing the use and programming of the decoder 14 of FIG. 1 to open token 16.

Figure 7:
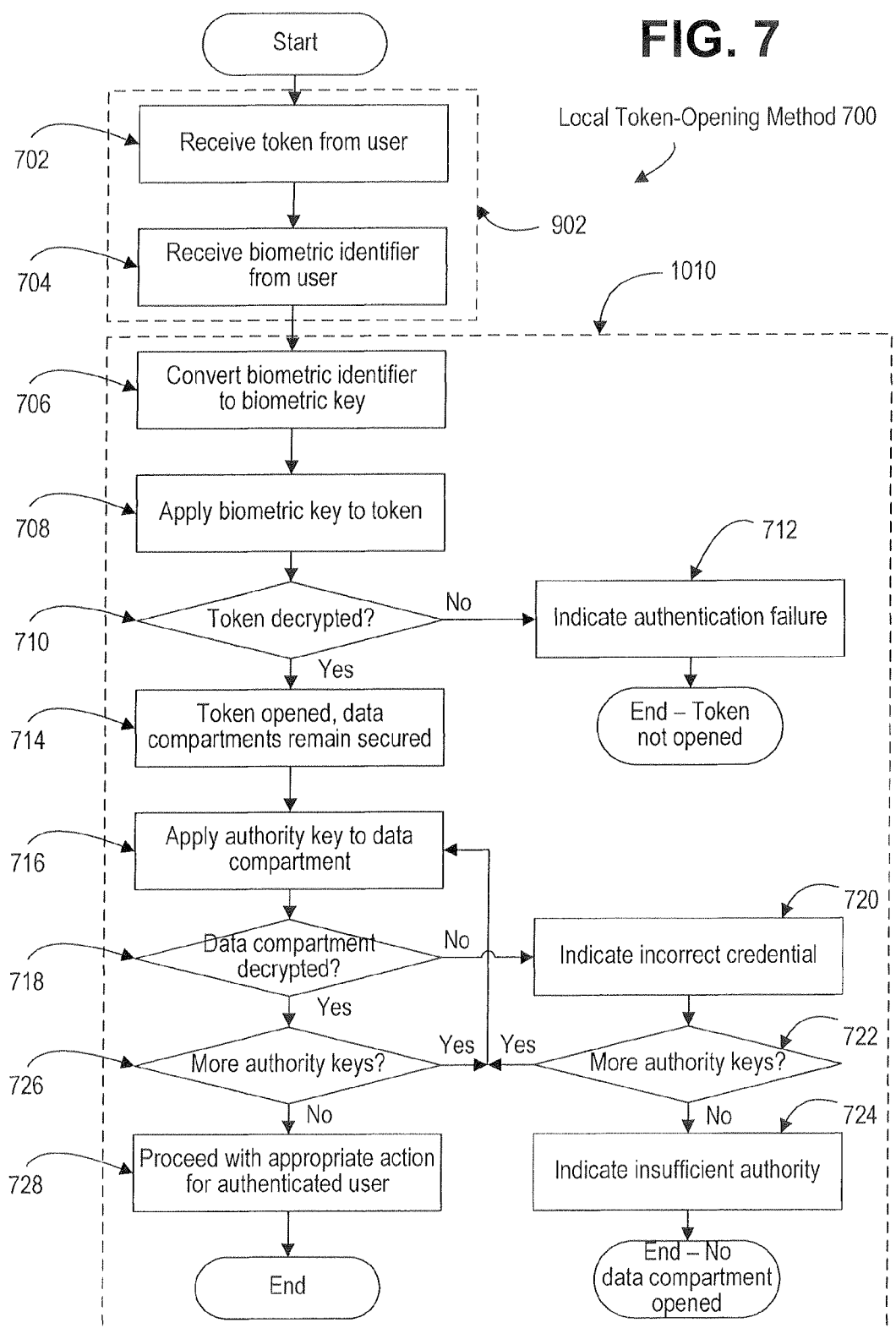
FIG. 7 is a flow diagram of a local token-opening method using the decoder of FIG. 1.

FIG. 7 shows an example local token-opening method 700 of the present invention. The method 700 starts at step 702 with the decoder 14 receiving a token 16 from a user. The token 16 is stored on the storage device 18 of the credential 12 and is received via the token interface device 44. In the embodiment shown in FIG. 2, for example, the PDA credential 12 wirelessly transmits the token 16 to wireless communication components (e.g., antenna, transceiver, and controller) of the decoder 14. In this way, the credential 12 actively communicates the token 12 to the decoder 14. In alternative embodiments, the credential 12 passively communicates the token 12 to the decoder 14. Such alternative embodiments include those in which the token interface device 44 is provided by an optical scanner, a magnetic reader, or an electrical connector, or in some other wireless applications for example those using smart card credentials 12.

At step 704 the decoder 14 receives a biometric identifier from the user. The biometric identifier is received via the biometric interface device 40. In the embodiment shown in FIG. 2, for example, a fingerprint scanner 40 is used to scan a fingerprint of the user as a digital template. In alternative embodiments in which the biometric interface device 40 is provided by an iris scanner, a facial feature scanner, an audio voice recorder, a DNA sampling device, etc., the decoder 14 similarly receives a digital template of the respective biometric identifier from the respective biometric interface device. It should be noted that the token input step 702 and the biometric identifier input/conversion steps 704/706 need not be performed in the described sequence.

At step 706 the decoder 14 uses the conversion software 50 to convert the biometric identifier digital template to a biometric key. Then at step 708 the decoder 14 uses the decryption software 48 to apply the biometric key to the token 16 in an attempt to open the token. If at step 710 the token 16 is not opened, then at step 712 the decoder 14 provides an indication that the authentication has failed. The failure indication is provided via the user interface devices 42, for example, by a red indicator light, a buzzer sounding, and/or a screen displaying a message. At this point, the decoder 14 has determined that the user, the token 12, or both are not authentic, and the method 700 ends without opening the token.

If, however, at step 710 the token 16 is opened by the biometric key, then the decoder 14 has determined that the user is authentic. The presenter of the credential 12 has now been authenticated as the authorized user because no one can present the user's biometric identifier, upon which the biometric key is based, except the authorized user. Because the token 16 decryption (and thus the user authentication) is done by the decoder 14 based on the received token and biometric identifier alone, there is no need for storing a biometric identifier file (e.g., on a central server or on the token), accessing it, and comparing it to the inputted biometric identifier, as is done in all other known biometric identity authentication systems.

Continuing to step 714, the token 16 is now opened, but the individual data compartments 24 remain unopened and securely encrypted. At step 716 the decoder 14 uses the decryption software 48 to apply one of its authority keys 26 in an attempt to open the corresponding data compartment(s) 24 of the token 16. As discussed above, a given token 16 may have one data compartment 24 and a given decoder 14 may have the one authority key 26 that opens that one data compartment. Or a given token 16 may have multiple data compartments 24, and a given decoder 14 may have one authority key 26 that opens one, some, or all of the data compartments or multiple authority keys 26 that open some or all of the data compartments. For example, the decoder 14 of FIG. 2 has only one authority key 26 for opening only one the twelve data compartments 24 of the token 16. And the decoder 14 of FIG. 3 has all of the authority keys 26 (or the only one) needed to open all twelve of the data compartments 24 of the token 16.

If at step 718 no data compartment 24 is opened by that authority key 26, then at step 720 the decoder 14 provides an incorrect credential indication. The incorrect credential indication is provided via the user interface devices 42, for example, by a red indicator light and/or a screen displaying a message. At this point, it has been determined that the user has presented the wrong credential 12 for the application (i.e., all of the data to be accessed is not on the token 16 presented), so no data compartment 24 is opened.

Next, at step 722 if the decoder 14 has any additional authority keys 26, then the method 700 returns to step 716. If the decoder 14 applies all of its authority keys 26 and no data compartments 24 are opened, then at step 724 the decoder 14 provides an insufficient authority indication. The insufficient authority indication is provided via the user interface devices 42, for example, by a red indicator light and/or a screen displaying a message. At this point, it has been determined that the decoder 14 does not have the authority level to access any of the data compartments 24, and the method 700 ends without opening any of the data compartments.

If, however, at step 718 the corresponding data compartment 24 for the applied authority key 26 is opened, then the method 700 continues to step 726. If the decoder 14 has any additional authority keys 26, then the method 700 returns to step 716 and continues until all of the authority keys on the decoder have been applied in an attempt to open all the corresponding data compartments 24.

Once all of the data compartments 24 openable by the decoder 14 have been opened, the method 700 continues to step 728. There, the decoder 14 initiates whatever next action is appropriate for the particular application, and then the method 700 ends. For example, in an authentication-only perimeter access application, the decoder 14 may send a signal to open a door, gate, or other perimeter access barrier device, without doing anything with the data accessed. In a digital driver's license application, the decoder 14 may display the accessed data via the user interface devices 42 (e.g., via a display screen). And in a digital wallet application, the decoder 14 may communicate with an integral or peripheral conventional credit card authorization device to use the credit card data from the token 16 to obtain authorization for a purchase. In any of these applications, the decoder 14 may be set up to also provide a successful authentication indication, for example, via the user interface devices 42 (e.g., by a green light or a message on a display screen).

In an alternative method, after the token 16 is opened at step 710 the method proceeds directly to step 728 and then concludes. This alternative method may be used, for example, in authentication-only applications in which the purpose of opening the token 16 is to prove that the presenter of the credential 12 is the authorized user to whom the credential was registered, and not to access the data of the token. Or this alternative method may used in applications where the token 16 includes only one piece or set of data, which was encrypted only based on the biometric key. In any event, in applications such as these in which the data or dataset has not been additionally encrypted based on an authority key, the alternative method does not include the steps related to opening individual data compartments (steps 714-726).

Additional alternative methods are suitable for use with decoders 14 set up for opening tokens 16 that, for an added layer of security, were encrypted based on more than one biometric identifier of the same or different type. For example, to authenticate a token 16 encrypted based on two biometric identifiers of the same type, the decoder 14 prompts the user to input a first preselected biometric identifier (e.g., a right index fingerprint) into the biometric input device 40. The decoder 14 receives the first preselected biometric identifier, uses the conversion software 50 to convert the first biometric identifier to a first biometric key, and uses the decryption software 48 to decrypt and thereby open the token 16. The decoder 14 also prompts the user to input a second preselected biometric identifier (e.g., a left index fingerprint) into the biometric input device 40. The decoder 14 receives the second preselected biometric identifier and uses the conversion software 50 to convert the second biometric identifier to a second biometric key. Now the decoder 14 uses the decryption software 48 with its authority keys 26 and the second biometric key to open the authorized data compartments 24 in a two-part process. In this way, after the token 16 is opened (and thus authenticated) with a first biometric identifier, then the authorized data compartments 24 are each opened by sequentially applying the corresponding authority key 26 (part one of the data-compartment-opening process)

and the second biometric key (part two of the data-compartment-opening process). Of course, the sequence of the two-part data-compartment-opening process can be switched (i.e., by applying the second biometric key and then the authority key). In addition, this alternative method can be carried out using a single biometric key (based on a single biometric identifier) for decrypting the token 16 and for decrypting (along with the authority keys) the data compartments 24.

In another example, there is provided an alternative method for authenticating a token 16 encrypted based on two (or more) biometric identifiers of different types by using a decoder 14 with two (or more) biometric input devices 40 of different types. The method is similar to that just described, except that the decoder 14 prompts the user to input a first preselected biometric identifier (e.g., a right index fingerprint) into a first one of the biometric input devices 40 and to input a second preselected biometric identifier (e.g., an iris print) into a second one of the biometric input devices. After that, the method is the same in that the decoder 14 proceeds to use the decryption software 48 with both its authority key 26 and the second biometric key to open the authorized data compartment 24 in a two-part process. It will be understood that in applications in which a decoder 14 has more than one biometric input device 40 (of the same or different type), the method may include receiving the biometric identifiers sequentially or simultaneously.

In yet another alternative method, a first authority key is combined with the biometric key to generate a second authority key that is used to encrypt/decrypt the data compartments in one step. For example, the first authority key and the biometric key can be concatenated together in any of several configurations, as persons of ordinary skill in the art know how to do. In this way, any compromise in the first authority key or the biometric key would compromise only part of the second authority key, not all of it, so the corresponding data compartment still could not be opened.

Having described the authentication system 10, its components, and methods of using the system and its components, several example applications will now be described. As mentioned above, these are all "physical presence" applications in which the user is physically present at the same location as one of the decoders and the identity authentication is done "locally" by that decoder. In these applications, the data can be secured only by one or more biometric key, or the data can be stored in data compartments secured individually by one or more authority keys and then the data compartments secured collectively by one or one or more biometric key.

EXAMPLE 1

Digital Wallet Application

In typical commercial embodiments, digital wallet credentials are in the form of mobile phones, though they can be in the form of smart cards or other objects. The mobile phone credential stores the token, which includes account information for credit cards and other bank cards (check cards, debit cards, ATM cards, etc.). If desired, the token can include additional information typically carried by the user in a conventional wallet such as data on a driver's license, an employee pass or badge, an insurance card, gas or retailer card, frequent flyer card, retailer affinity card, and/or a movie rental card, as well as photographs of family and friends. As such, this is typically a "secured data" application in which the token includes one or more data compartments for storing the financial data with a higher degree of security.

In use, after the decoder accesses the secured data, the decoder displays (e.g., via a display screen or touch-screen user interface device) a menu of the user's bank card accounts from which the user can select a method of payment. Once a bank card account is selected (e.g., via a keypad or touch-screen user interface device) by the user, the payment transaction proceeds in a similar method as conventional bank card transactions. The decoders can be located in user's homes or offices, or the decoders can be located at retailers and other places where users purchase goods and services.

EXAMPLE 2

Medical Insurance Card Application

In this application the credentials provide insurers with the assurance that a patient claiming insurance coverage is actually the person insured. In typical commercial embodiments, the credentials are in the form of smart cards with a chip or plastic cards with a magnetic stripe or barcode, and the tokens secure the user's insurance information. As such, this is typically a "secured data" application in which the token includes one or more data compartments for storing the insurance data with a higher degree of security.

In use, a user presents an insurance card credential and a biometric identifier to a decoder in his doctor's office. After the decoder authenticates the token and the user and accesses the secured data, the patient's insurance information is transferred to the doctor's office records. The decoders can be connected (wirelessly or wired) to the local network in the doctor's office so that the insurance data is electronically transferred to the doctor's office records, or the data transfer can be done manually. In addition, digital signatures can be established, if desired. This authentication process is done during each patient visit, and does not require the decoder be connected to the insurance company's server.

EXAMPLE 3

Medical Passport Application

In this application the credentials help reduce errors when providing medical services. In typical commercial embodiments, the credentials are in the form of smart cards with a chip, plastic cards with a magnetic stripe, or flash (thumb) drives, and the tokens secure instructions relating to medial services prescribed for the user. As such, this is typically a "secured data" application in which the token includes one or more data compartments for storing the medical instructions data with a higher degree of security.

When medical services are prescribed, the doctor uses a set-up workstation or decoder to issue the credential and enter all of the prescribed orders into the credential's token. Each order is typically secured in an individual data compartment of the token so that for example a lab will only have the authority level on its decoder to access the doctor's orders for the lab, and the lab will not have access to any other information on the token. The credential can be updated with the lab results, for example, by the lab decoder (if provided with data-updating components) or by the doctor's set-up workstation or decoder. When the patient goes for the actual procedure, the credential travels with them, and the patient and the credential are authenticated by a decoder in the operating room (OR). Then the OR decoder accesses all of the patient information related to the procedure and displays (e.g., via a user interface display device) the information in the OR so that the information cannot be easily overlooked.

EXAMPLE 4

Government-Issued Identification Application

In this application the credentials are secure and authenticable government-issued identifications. Such identifications may include driver's licenses, passports, visas, green cards, social security/entitlement cards, welfare distribution cards, and other government-issued identifications. These government-issued credentials are issued by government agencies such as a state's department of motor vehicles or the federal government's social security administration, and these agencies have set-up workstations for issuing the credentials. In typical commercial embodiments, the credentials are in the form of smart cards with a chip or plastic cards with a magnetic stripe, and the tokens secure the data typically on these identifications. As such, these are typically "secured data" applications in which the token includes one or more data compartments for storing the identification data with a higher degree of security.

EXAMPLE 5

Perimeter Access Application

Typical perimeter access applications are for securing entry into buildings and parking garages (e.g., government, military, industrial), bases (e.g., military installations), other facilities (e.g., water treatment plants, nuclear power plants), and secured areas/zones in any of these (e.g., biological laboratories, computer rooms). In these applications, the credentials are typically in the form of mobile phones, keychain fobs, smart cards, or ID badges that are issued to employees, visitors, contractors, or residents of the area being secured. As such, this is typically an "authentication-only" application in which the act of opening the token authenticates the user and the data secured in the token is not used for anything further. So the data in the token can be random and need not be also secured in a data compartment. For added security and/or to store user-identifying data (e.g., user name), the data can also be secured in one or more data compartments.

In use, after the decoder opens the token, the decoder provides a "user authenticated" indication (e.g., via an illuminated indicator light or a message on a display screen of a user interface device). At that point, security personnel can manually permit the user entry into the secured area. In some applications the decoder communicates (e.g., wirelessly or by wires) with an actuator of barrier equipment to open a door, gate, or other barrier object, thereby automatically permitting the user entry into the secured area. In addition, in some applications the secured data (whether in a data compartment of a token or in a token without data compartments) corresponds to a certain security level for the user. So the system can be used in a facility with multiple secured zones with differing security levels (e.g., low, medium, high, top secret) and a decoder could authenticate a user but still deny the user access to a certain secured area if the required security clearance level is not stored on the token. In this way, the system can be used to authenticate users and also to determine if an authenticated user is authorized (with the needed security clearance) to enter a secured area.

EXAMPLE 6

Air Transport Industry (ATI) Worker Application

This application provides the ID credentials that are issued to employees and contractors within the Air Transport Industry. The credentials are typically in the form of smart cards or ID badges that are issued to pilots, flight attendants, baggage handlers, terminal concession workers, etc. As such, this is typically an "authentication-only" application, though for added security it may be desirable to store user-identifying data (e.g., user name) or security clearance level data in the tokens or in data compartments of the tokens.

In this application, the system works similarly to the Perimeter Access Application. In this application, however, the system provides for interoperability with ATI systems (e.g. employee access systems, passenger access systems, etc.) across multiple ATI sites without connectivity to each other site or to a centrally located database. For example, an ID credential issued by a set-up workstation of any airline for any pilot will work with a decoder in any airport in the ATI system. The ID credentials can be revoked by any decoder at any airport in the ATI system when a revoke signal is sent to the decoders by an ATI control server connected to the ATI system. But user authentication (excluding revocations) happens locally at the decoders without the need for connecting to a central database or server.

EXAMPLE 7

Air Transport Industry (ATI) Passenger Application

This application is for authenticating airline passengers as they travel within the ATI. The credentials are typically in the form of boarding passes that are issued to the airline passengers, such as conventional paper boarding passes each including a printed barcode storing encrypted data or boarding pass tokens stored on mobile phone credentials. As such, this is typically an "authentication-only" application, though for added security it may be desirable to store user-identifying data (e.g., user name, flight information, etc.) in the tokens or in data compartments of the tokens.

Passenger-users register once (e.g., at a set-up workstation such as that described above, an airline's website server, a home desktop or laptop computer, etc.), and a network-connected ATI server (or other computer device) generates a public biometric key from a biometric identifier inputted by the user. The public biometric key is then saved in a central ATI database, with each individual airline, or elsewhere, and accessed later (e.g., by the airline's or ATI's website server) to generate the boarding pass tokens. When the user is ready to receive (e.g., print or download at a home computer, airport kiosk, mobile phone, etc.) an airline boarding pass, the public biometric key is accessed and used to encrypt the data to form the boarding pass token. So the user receives a boarding pass token that was encrypted based on the public biometric key.

It should be noted that the initial user registration can occur most anywhere, even manually, by regular mail, etc. However, if it is not at an ATI network-connected computer (e.g., a set-up workstation, kiosk, etc.), the biometric identifier cannot be entered (at least not with absolute security) to create the public biometric key. Thus, for security reasons, the biometric identifier for creating the public biometric key can be entered by the user only at an ATI network-connected computer. So if the initial user registration is at an ATI network-connected computer, the user enters a biometric identifier then. But if the initial registration is not at an ATI network-connected computer (e.g., from an airline's website server via a home or laptop computer, by mail, etc.), then the user must receive (e.g., print, download, etc.) a boarding pass token the first time at an ATI network-connected computer. The ATI system now has the biometric identifier for future use, so the user can receive future boarding pass tokens from other than an ATI network-connected computer (e.g., from an airline's website server via a home desktop or laptop computer, etc).

The authentication occurs at the airport, when the user presents the boarding pass token (on a paper boarding pass, a cell phone, etc.) and the proper biometric identifier to a decoder. Only the private biometric key, which is generated by the decoder at the airport based on the biometric identifier, can open the boarding pass token. In this way, no one but the user (the only person with the biometric identifier needed to generate the private biometric key) can use the boarding pass token. Accordingly, the decoders in the airport can be used to accurately authenticate all of the passengers/users as they move through the airport, so they provide a much more secure airport with much less passenger delay and at much less cost than conventional systems.

In addition, the token on the boarding pass credential can store financial payment information (e.g., bank card account data). Passengers with their hands full with baggage do not have a free hand to dig out a wallet, but they typically have their boarding pass in one of their hands. So they can make purchases out on the concourse (e.g., food, magazines, etc.) by presenting the boarding pass credential and a biometric identifier, both of which they still have accessible.

EXAMPLE 8

Air Transport Industry (ATI) Baggage Application

This application assures that when baggage is picked up by passengers in an airport and removed from the baggage area, that the bag actually belongs to that passenger. In this application, the ID credentials are typically in the form of smart cards with a chip or plastic or paper tags with a barcode. This is typically an "authentication-only" application, though for added security it may be desirable to store user-identifying data (e.g., user name) in the tokens or in data compartments of the tokens.

When a passenger-user checks in for a flight at an airport check-in device (e.g., a network-connected computer at the main check-in counter inside the terminal or at the curb-side check-in counter outside the terminal), a bag-tag credential is generated with a token printed on it (e.g., at any check-in location), and the bag-tag credential is attached to a checked bag. When the passenger retrieves the bag after the flight and moves to the exit of the baggage area, a decoder scans the token on the bag-tag credential and the passenger presents a biometric identifier to the decoder. If the decoder indicates that authentication has occurred, then the baggage belongs to that passenger.

Figure 8:
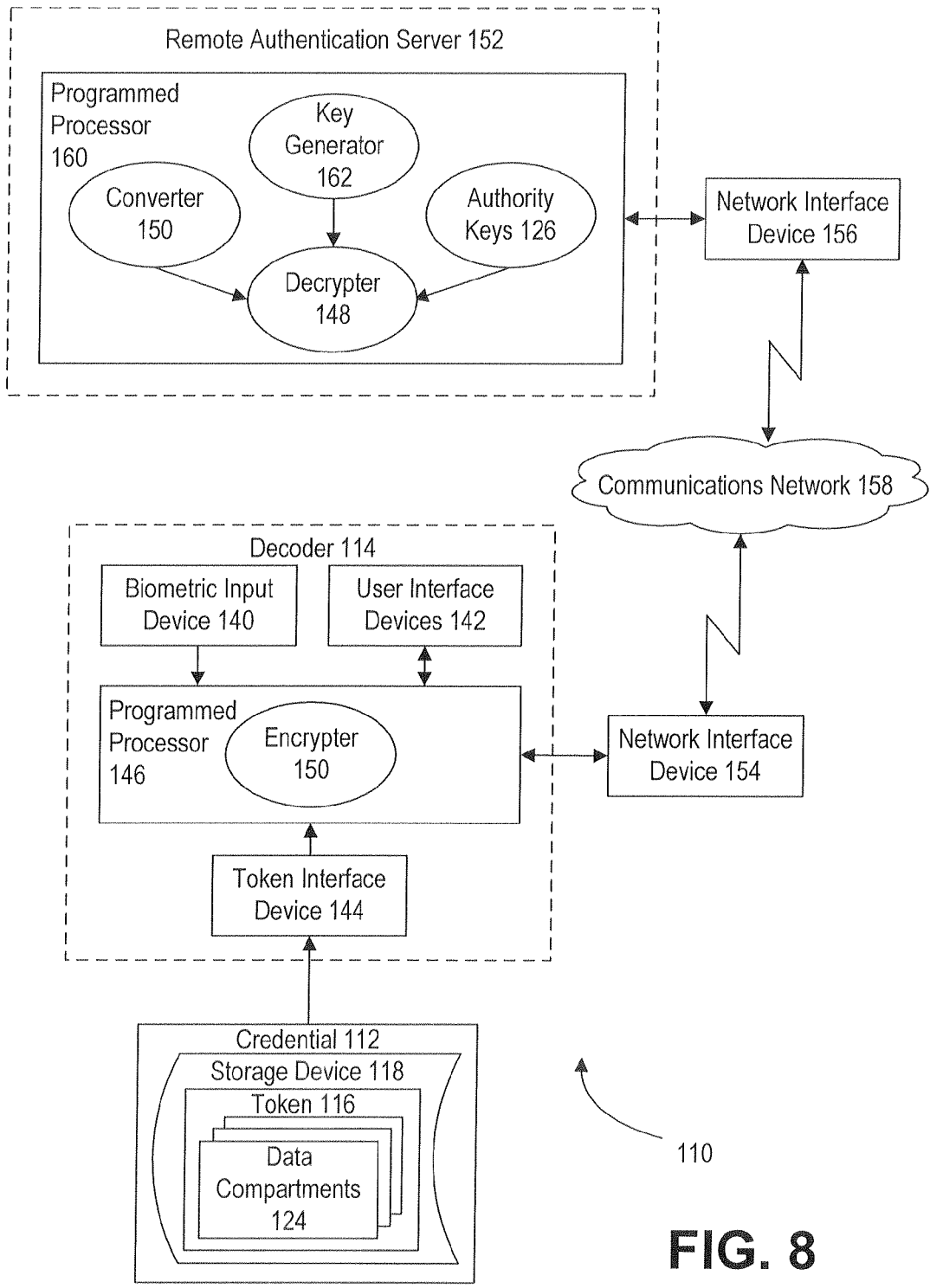
FIG. 8 is a block diagram of an identity authentication system according to a second example embodiment of the present invention, showing a decoder, a credential, and a remote authentication server.

Turning now to FIG. 8, there is shown an identity authentication system 110 according to a second example embodiment of the present invention. The system includes at least one credential 112, at least one decoder 114, and at least one remote authentication server 152. The system 110 of this embodiment is designed for use in remote presence or virtual applications in which the user is authenticated "remotely," for example, for network access, web transactions, etc.

The credentials 112 are provided by the same or similar credentials described in the first example system 10. For example, the credentials 112 each include at least one data storage device 118 storing a token 116, which may include one or more data compartments 124, with each of these components being the same or similar to those described above. In addition, the decoders 114 are similar to those described in the first example system 10. For example, the decoders 114 each include (or are operably connected to) at least one biometric input device 140, at least one user interface device 142, at least one token interface device 144, and at least one programmed processor system 146, with each of these components being the same or similar to those described above.

In this embodiment, a biometric identifier is converted to a biometric key, the biometric key is applied to decrypt the token 116, and authority keys 126 applied to decrypt the data compartments 124, as is done in the above-described system 10 and method 700. However, in this embodiment, the conversion of the biometric identifier to the biometric key and the application of the biometric key and the authority keys 126 to decrypt the token 116 and the data compartments 124 is done remotely on a remote authentication server 152 instead of locally on the decoder 114.

Accordingly, the decoder 114 has a network interface device 154 and the authentication server 152 has a network interface device 156, thereby enabling the decoder and the authentication server to connect to a communications network 158 and communicate with each other. The network interface devices 154 and 156 may be integral components of the decoder 114 and the authentication server 152, respectively, or they may be separate components that are operably connected (wirelessly or by wires) thereto. The communications network 158 may be a global communications network (e.g., the Internet), a local area network (LAN), a cellular network, or the like.

In addition, the decoder 114 includes encryption software 150 (whereas the above-described decoder 14 includes decryption software 48) for the programmed processor 146. And the decoder 114 does not have decryption software, conversion software, and/or the authority keys 126. (So the decoder 114 does not have the capability to apply the biometric key and the authority keys 126 to decode/decrypt and thereby open the token 116 and the data compartments 126, and it functions as a collection device for the remote authentication server 152. Regardless, for consistency herein the term "decoder" is used for this data-gathering device.) Instead, the authentication server 152 has a programmed processor system 160 that stores and/or accesses software elements including decryption software 148, conversion software 150, and authority keys 126, with each of these elements being the same or similar to those described above. Furthermore, the programmed processor system 160 stores and/or accesses a one-time key (OTK) generator 162 of a conventional type known in the art. For example, the OTK generator 162 can be based on known public key/private key encryption techniques for generating unique one-time encryption keys.

Although not shown individually for purposes of clarity, the programmed processor system 160 includes one or more processors, memories, and/or other logic that together define the overall processing power of the authentication server 152. As persons skilled in the art can appreciate, the software elements are shown in a conceptual manner for purposes of illustration and may not reside in memory simultaneously or in their entireties. Rather, in the manner in which computers are known to operate, the software elements or portions thereof can be retrieved on an as-needed basis from memory chip, a fixed-medium local drive, a removable-medium local drive, and/or a network-connected remote computer or storage device. In addition, the functions of the software elements can be distributed over a greater number of software elements or combined/condensed into fewer elements. Additional software elements commonly included in computing systems, such as an operating system, a graphical user interface, utilities, interface device drivers, etc., may be included but are not shown for purposes of clarity. In view of the descriptions herein, persons skilled in the art will be readily capable of providing suitable software and otherwise programming or configuring the authentication server 152 to perform the remote authentication methods described below. In addition, interface devices (a keyboards, mouse, monitor, etc.) may be connected to the server 152 for maintenance functions.

In this embodiment, the decoder 114 receives the biometric identifier and the token 116, retrieves an OTK from the remote authentication server 152, uses the OTK to encrypt the token and the biometric identifier into a package, and forwards the encrypted package to the authentication server. The authentication server 152 then uses the OTK (which the server generated in the first place) to open the encrypted package and thereby access the token 116 and the biometric identifier. At this point, the authentication server 152 can use the conversion software 150 to convert the biometric identifier to the biometric key, use the decryption software 148 to apply the biometric key to the token 116, and use the decryption software to apply the authority keys 126 to the data compartments 124, the same as the decoder 14 does in the local authentication system 10 described above.

In an alternative embodiment, the decoder also includes copies of the decryption software, conversion software, and the authority keys. In this embodiment, the decoder can be used for local authentication (as in the decoder of the first example embodiment) and it also can be used for remote authentication (as in the decoder of the second example embodiment).

Having described example embodiments of a decoder 114 and an authentication server 152 used in a remote authentication system 110, methods of using the decoders and authentication servers to open the tokens 116 now will be described. It will be understood that the remote token-opening methods can be carried out using the authentication server 152 in conjunction with the decoder 114 just described or the decoder 14 of the first embodiment adapted to include the needed components and programming for this method. Or the remote token-opening methods can be carried out using other similar devices having similar components for performing the recited steps. For convenience, the remote token-opening methods will be described in conjunction with describing the use and programming of the decoder 114 and the authentication server 152 of FIG. 8 to open token 116.

Figure 9:
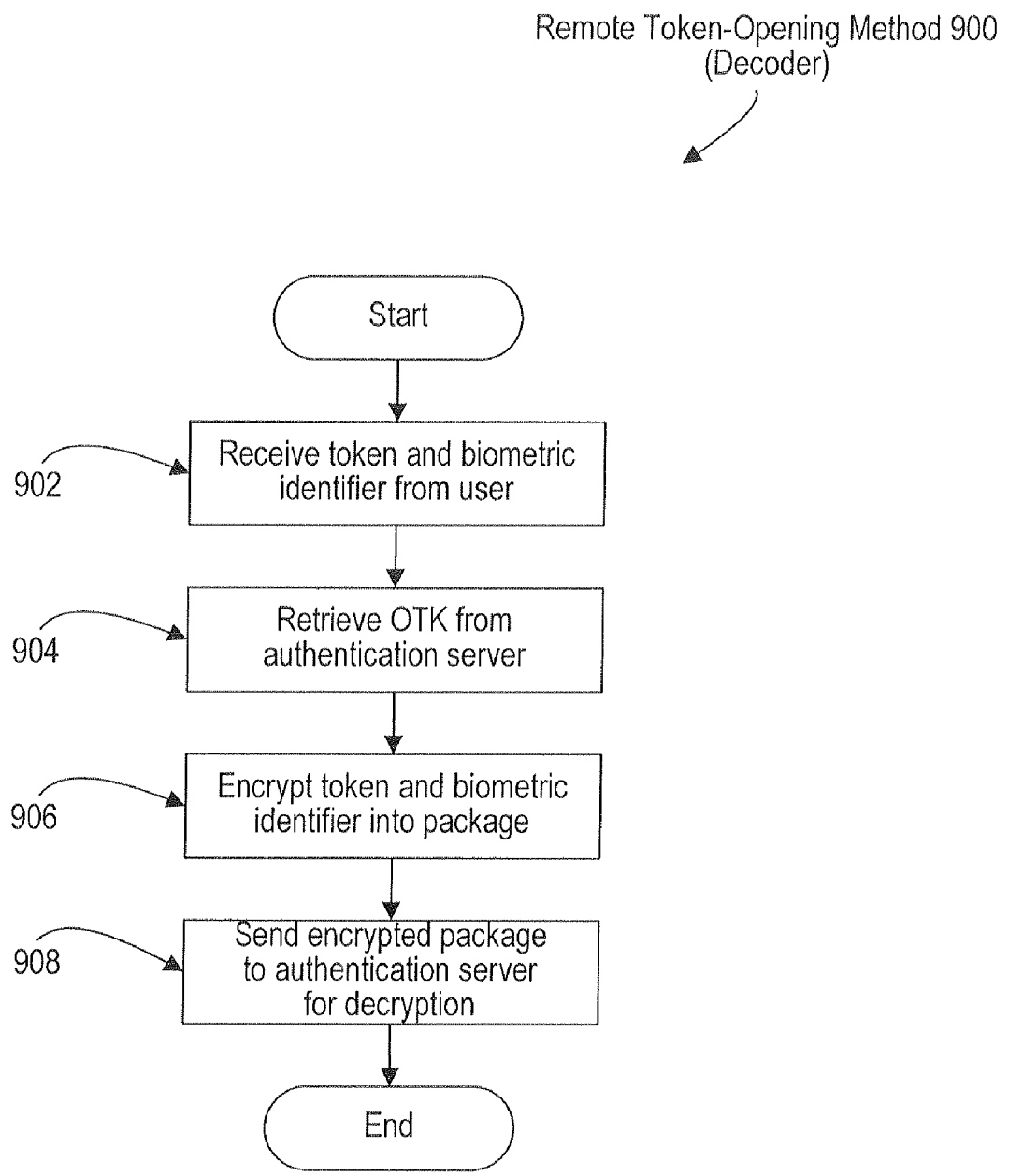
FIG. 9 is a flow diagram of a remote token-opening method using the decoder of FIG. 8.

FIG. 9 shows an example remote token-opening method 900 using the decoder 114 of FIG. 8. The remote token-opening method 900 starts at step 902 with the decoder 114 receiving the token 116 and the biometric identifier from the user. This step is the same as the steps collectively indicated as 902 in the previously described local authentication method 700, and for brevity the details are not repeated here.

Then at step 904 the decoder 114 retrieves an OTK from the authentication server 152. The decoder 114 does this by sending a request for the OTK via its network interface device 154 to the authentication server 152 and then receiving the OTK via its network interface device from the authentication server. Next, at step 9046 the decoder 114 uses the encryption software 150 to encrypt the token 116 and the biometric identifier into a package. And then at step 908 the decoder 114 sends the encrypted package to the authentication server 152 for remote opening of the token 116 by the authentication server.

Figure 10:
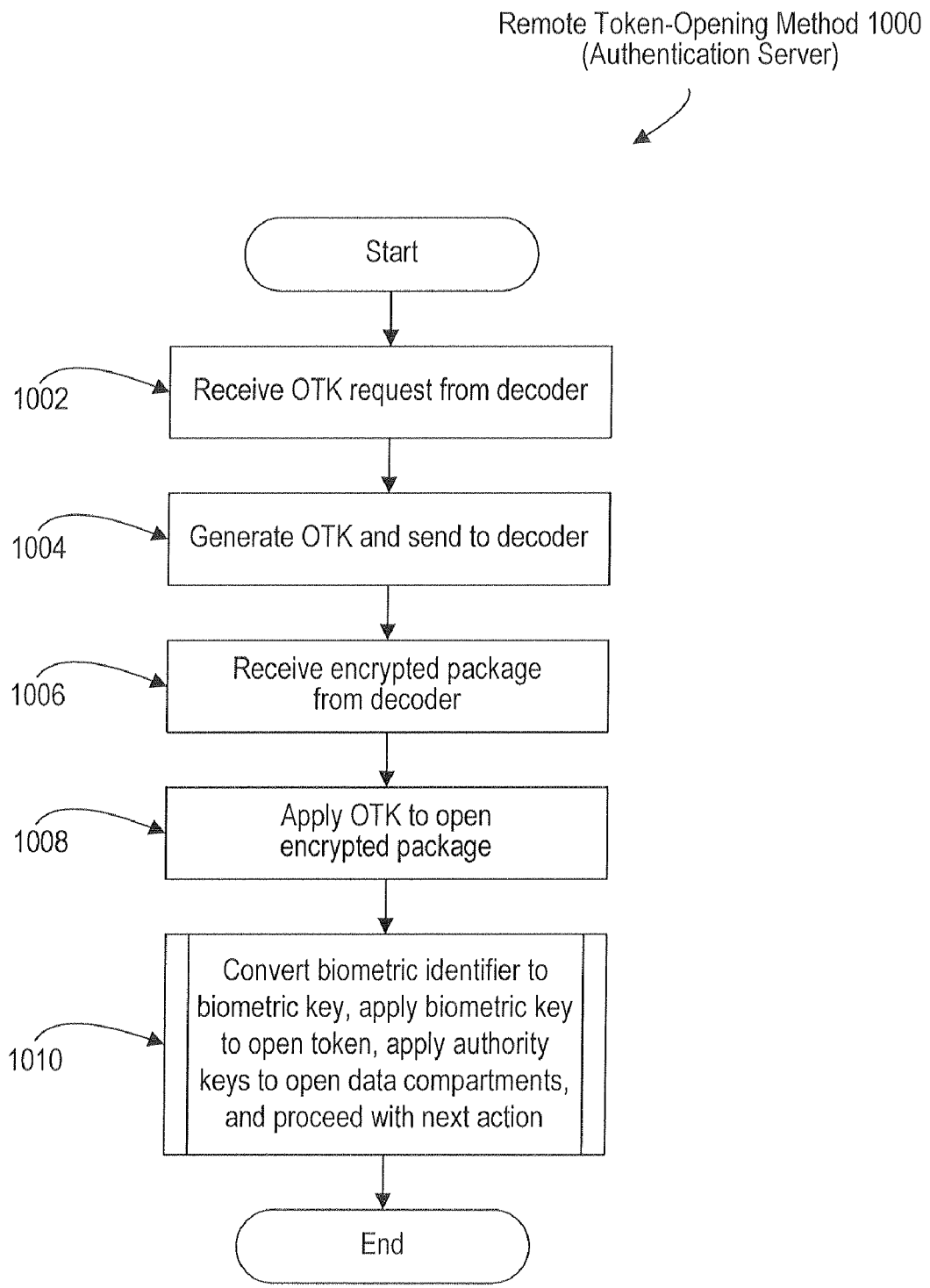
FIG. 10 is a flow diagram of a remote token-opening method using the authentication server of FIG. 8.

FIG. 10 shows an example remote token-opening method 1000 using the authentication server 152 of FIG. 8. The remote token-opening method 1000 starts at step 1002 with the authentication server 152 receiving the request from the decoder 114 for the OTK. The authentication server 152 receives the OTK request via its network interface device 156. Then at step 1002 the authentication server 152 uses the OTK generator 162 to generate the unique OTK and uses its network interface device 156 to send the OTK to the decoder 114. In addition, the authentication server 152 stores the OTK, at least temporarily, in memory.

Next, at step 1006 the authentication server 152 receives the encrypted package from the decoder 114. The encrypted package is received by the authentication server 152 via its network interface device 156. Then at step 1008 the authentication server 152 uses the decryption software 148 to apply the OTK to open the encrypted package. With the encrypted package open, the authentication server 152 now has access to the token 116 and the biometric identifier.

The remote token-opening method 1000 concludes at step 1010 with the authentication server 152 processing the token 116 like a local decoder. Thus, the authentication server 152 uses the conversion software 150 to convert the biometric identifier to a biometric key, uses the decryption software 148 to apply the biometric key to open the token 116, uses the decryption software to apply the authority keys 126 to open the data compartments 124, and proceeds with the next action for the now-authenticated user. This step is the same as the steps collectively indicated as 1010 in the previously described local authentication method 700, and for brevity the details are not repeated here.

In some applications, the next action is for the authentication server 152 to send the data from the token 116 its network interface device 156 to another network-connected server for further processing. For example, in an application in which the credential 116 is a digital wallet with a token 116 storing credit card information, the authentication server 152 can send the credit card information directly to a transaction server of the credit card company for final processing. In this way, the now unsecured credit card data is not sent back to the local decoder 114. This allows for remote authentication, yet maintains tight controls to protect the system (and therefore the user and the data) from compromise.

The remote authentication system 110 and methods 900 and 1000 just described are exemplary of the invention. It will be understood, then, that the remote authentication system 110 and methods 900 and 1000 may be adapted to include, for example, the adaptations of the alternative embodiments and methods described herein for the local authentication system 10 and method 700, as well as other variations readily discernable to those of ordinary skill in the art.

Having described the authentication system 110, its components, and methods of using the system and its components, several example applications will now be described. As mentioned above, these are all remote presence or virtual applications in which the user is authenticated "remotely" from the decoder. In these applications, the data can be secured only by one or more biometric key, or the data can be stored in data compartments secured individually by one or more authority keys and then the data compartments secured collectively by one or one or more biometric key.

EXAMPLE 9

Gaming Application

This application provides for online and mobile gaming (i.e., gambling). In particular, this application provides a way for a gaming company to know who the user is on the other end of a bet, which is important to the gaming industry, the public (from underage and illegal gaming perspectives), and taxing authorities. In typical commercial embodiments, gaming credentials are in the form of mobile phones, laptops, PDAs, or other portable electronic devices, though the credential can be provided by smart cards or other plastic cards. The gaming credential stores the token, which includes user account and payment information (e.g., bank card data, checking account data). As such, this is typically a "secured data" application in which the token includes one or more data compartments for storing the financial data with a higher degree of security.

In use, a user connects to a gaming website using a mobile phone, laptop, PDA, etc. and inputs his credential's token and a biometric identifier to a decoder (e.g., at the user's home). The decoder connects to an authentication server for performing the authentication. The authentication server can be owed/controlled by the gaming website company or by a third party that processes the payments for the gaming company. In embodiments in which the credential is a portable electronic device that can be used for playing games (e.g., mobile phones, laptops, PDAs), the credential may include the token and also include components of the decoder. In this way, the user can play games wherever there is network access. In addition, this application can be used in gaming establishments, and not just for online gaming websites.

EXAMPLE 10

Network Access Application

This application provides for user authentication over computer networks. In particular, this application allows network administrators to know with certainty who is on their network, and it allows webmasters to know with certainty who is connecting to their websites. This is especially useful for online banking, membership websites like MYSPACE or FACEBOOK, or any other website where it is important to know with certainty who is actually connecting to the site. This application also can be used for determining with certainty who is purchasing on websites such as adult or other websites that cannot legally sell to minors. The credentials can be in most any form described herein, and the decoders are located where the users are (e.g., at office computers, at home computers, in mobile phones). As such, this is typically an "authentication-only" application, though for added security it may be desirable to store user-identifying data (e.g., user name) in the tokens or in data compartments of the tokens.

In a third example embodiment, the token is stored on a portable electronic device such as a PDA, mobile phone, or laptop credential and includes data such as confidential corporate or user information. In this embodiment, the token is encrypted based on a first OTK (instead of based on a biometric key) that is stored or accessible by the authentication server. When the users want to access the data, they will need to be authenticated. This authentication does not happen on the portable electronic device, but rather on the authentication server. The device collects the biometric identifier from the user, obtains a second OTK from the authentication server, encrypts the token and the biometric identifier in a package based on the second OTK, and sends the encrypted package to the authentication server for it to conduct the authentication process. Once the authentication process is completed, the authentication server sends to the device the first OTK for decryption of the data and a third OTK for re-encrypting the data. The device then uses the first OTK to decrypt the data. Because the data is always encrypted, the first OTK is only used once, and the only person who can obtain the first OTK is an authorized user, the data on the device is always safe, even if the device is lost. After the data is used, or alternatively after a time-out period, the third OTK re-encrypts the data.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An identity authentication system for one or more users, the system comprising:
   at least one credential issued to one of the users, wherein the credential includes a security token comprising data encrypted by encryption software with a cryptographic algorithm and encrypted based on a biometric key that is generated from a biometric identifier of the user; and
   at least one decoder including a token interface device, a biometric input device, and a network interface device, and having access to encryption software with the cryptographic algorithm, wherein the biometric input device receives the biometric identifier from the user, the token interface device receives the token from the user credential, the network interface device requests and receives a one-time key (OTK), the encryption software applies the cryptographic algorithm and the OTK to encrypt the token and the biometric key into a package, and the network interface device transmits the encrypted package; and
   an authentication server including a network interface device, OTK generation software, conversion software, and decryption software with the cryptographic algorithm, wherein the network interface device receives the OTK request, the OTK generation software generates the OTK, the network interface device sends the OTK to the decoder and receives the encrypted package from the decoder, the conversion software converts the biometric identifier to the biometric key, and the decryption software applies the cryptographic algorithm and the biometric key to the token to decrypt and thereby open the token, wherein the token is only openable upon the user presenting the biometric identifier used to encrypt the token so that opening the token authenticates the user, and wherein the token is only openable upon the simultaneous presence of the token, the biometric identifier used to encrypt the token, and the authentication server with the decryption software including the cryptographic algorithm.

2. The system of claim 1, wherein the token includes at least one data compartment storing the data, and the data compartment is encrypted by the same or different encryption software and encrypted based on at least one authority key.

3. The system of claim 2, wherein the authentication server has access to the at least one authority key, wherein after opening the token the authentication server applies the decryption software and the at least one authority key to open the data compartment.

4. The system of claim 2, wherein the token encryption and the data compartment encryption are based on at least two biometric keys generated from the same or a different biometric identifier of the user.

5. The system of claim 4, wherein the authentication server generates the at least two biometric keys from the same or the different biometric identifier, and the authentication server has access to the at least one authority key, wherein after opening the token with a first one of the biometric keys the authentication server applies the decryption software, the at least one authority key, and a second one of the biometric keys to open the data compartment.

6. The system of claim 1, wherein the token includes a plurality of data compartments each able to store one piece or set of the data and each encrypted by the same or different encryption software and encrypted based on at least one of a plurality of authority keys, and the data compartments are collectively encrypted based on the biometric key to form the token.

7. The system of claim 6, wherein the authentication server has access to at least one of the authority keys, wherein after opening the token the authentication server applies the same or different decryption software and its at least one authority key to open the data compartment corresponding to its at least one authority key, and wherein the authentication server cannot open any of the data compartments for which it does not have access to the corresponding authority key.

8. The system of claim 1, wherein the authentication server is located remotely from the decoder for remote authentication applications.

9. The system of claim 1, wherein the decoder includes copies of the decryption software, the conversion software, and the authority keys for local authentication applications.

10. The system of claim 1, further comprising a set-up workstation including at least one biometric input device, at least one token interface device, conversion software, and the encryption software with the cryptographic algorithm, wherein the biometric input device receives the biometric identifier from the user, the conversion software converts the biometric identifier to the biometric key, the encryption software applies the cryptographic algorithm and the biometric key to encrypt the data to form the token, and the token interface device transfers the token to the credential.

11. The system of claim 10, wherein the set-up workstation has access to at least one authority key, encrypts at least a portion of the data in a data compartment of the token based on the authority key, and then encrypts the data compartment of the token based on the biometric key.

12. The system of claim 1, wherein the credential is a network access credential and the token includes user identification information.

13. An authentication server for opening a security token of a credential of a user, the server comprising:
a network interface device;
one-time key (OTK) generation software that is operable to generate an OTK;
conversion software that is operable to convert biometric identifiers to biometric keys; and
decryption software with a cryptographic algorithm, wherein the OTK generation software generates a OTK, the network interface device sends the OTK to a decoder and receives an encrypted package from the decoder, the conversion software converts a biometric identifier to a biometric key, and the decryption software applies the cryptographic algorithm and the biometric key to the token to decrypt and thereby open the token, wherein the token is only openable upon the user presenting the biometric identifier used to encrypt the token so that opening the token authenticates the user, and wherein the token is only openable upon the simultaneous presence of the token, the biometric identifier used to encrypt the token, and the authentication server with the decryption software including the cryptographic algorithm.

14. The authentication server of claim 13, wherein the token includes at least one data compartment storing the data, the data compartment is encrypted by the same or different encryption software and encrypted based on at least one authority key, and the authentication server has access to the at least one authority key, wherein after opening the token the authentication server applies the decryption software and the at least one authority key to open the data compartment.

15. The authentication server of claim 14, wherein the token encryption and the data compartment encryption are based on at least two biometric keys generated from the same or a different biometric identifier of the user, and the authentication server generates the at least two biometric keys from the same or the different biometric identifier, wherein the authentication server has access to the at least one authority key, wherein after opening the token with a first one of the biometric keys the authentication server applies the decryption software, the at least one authority key, and a second one of the biometric keys to open the data compartment.

16. The authentication server of claim 13, wherein the token includes a plurality of data compartments each able to store one piece or set of the data and each encrypted by the same or different encryption software and encrypted based on at least one of a plurality of authority keys, and wherein the data compartments are collectively encrypted based on the biometric key to form the token.

17. The authentication server of claim 13, wherein the authentication server has access to at least one of the authority keys, wherein after opening the token the authentication server applies the same or different decryption software and its at least one authority key to open the data compartment of the token corresponding to its at least one authority key, and wherein the authentication server cannot open any of the data compartments of the token for which it does not have access to the corresponding authority key.

18. The authentication server of claim 13, wherein the cryptographic algorithm of the decryption software is the same as that used to encrypt data based on the biometric key to create the token.

19. A method of authenticating the identity of a user with a security token comprising data encrypted based on a biometric key that is based on a biometric identifier of the user, the method comprising:
receiving from a decoder a request for a one-time key (OTK);
generating the OTK and sending it to the decoder;
receiving from the decoder a package that includes the token and the biometric key and that is encrypted based on the OTK;
decrypting the encrypted package using the OTK to access the token and the biometric identifier;
converting, via conversion software, the biometric identifier to the biometric key; and decrypting, via decryption software with a cryptographic algorithm, the token using the biometric key to open the token, wherein the decryption software applies the cryptographic algorithm and the biometric key to the token to decrypt and thereby open the token, wherein the token is only openable upon the user presenting the biometric identifier used to encrypt the token so that opening the token authenticates the user, and wherein the token is only openable upon the simultaneous presence of the token, the biometric identifier used to encrypt the token, and the authentication server with the decryption software including the cryptographic algorithm.

20. The method of claim 19, wherein the token includes at least one data compartment storing the data and encrypted based on at least one authority key, and the method further comprises:
   accessing the at least one authority key; and
   decrypting the data compartment using the at least one authority key after decrypting the token using the biometric key.

21. The method of claim 20, wherein the step of decrypting the data compartment includes decrypting the data compartment using the at least one authority key and using a second biometric key generated from the same or a different biometric identifier of the user.

22. The method of claim 19, wherein the token includes a plurality of data compartments each storing a portion of the data and each encrypted based on at least one of a plurality of authority keys, and the method further comprises:
   accessing the authority keys; and
   decrypting the data compartments using the authority keys after decrypting the token using the biometric key.

23. The method of claim 19, wherein the step of decrypting the token using the biometric key to open the token comprises applying a cryptographic algorithm that is the same as that used to encrypt data based on the biometric key to create the token.

* * * * *